(12) United States Patent
Merkel

(10) Patent No.: US 8,501,296 B2
(45) Date of Patent: *Aug. 6, 2013

(54) STABILIZED LOW-MICROCRACKED CERAMIC HONEYCOMBS AND METHODS THEREOF

(75) Inventor: Gregory Albert Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 1197 days.

This patent is subject to a terminal disclaimer.

(21) Appl. No.: 12/394,453

(22) Filed: Feb. 27, 2009

(65) Prior Publication Data

US 2009/0220736 A1  Sep. 3, 2009

Related U.S. Application Data

(60) Provisional application No. 61/067,751, filed on Feb. 29, 2008.

(51) Int. Cl.
*B32B 3/12* (2006.01)
*C03C 3/07* (2006.01)

(52) U.S. Cl.
USPC .......................................... 428/116; 501/80

(58) Field of Classification Search
None
See application file for complete search history.

(56) References Cited

U.S. PATENT DOCUMENTS

| RE39,120 E | * | 6/2006 | Sechi et al. | 501/9 |
| 7,704,296 B2 | * | 4/2010 | Merkel | 55/523 |
| 2008/0032090 A1 | * | 2/2008 | Beall et al. | 428/116 |

FOREIGN PATENT DOCUMENTS

| WO | 2008/005337 | 1/2008 | 35/195 |
| WO | 2008/027270 | 3/2008 | 35/195 |
| WO | 2008/027422 | 3/2008 | 35/195 |
| WO | 2009/005679 | 1/2009 | 35/195 |

* cited by examiner

*Primary Examiner* — Jennifer McNeil
*Assistant Examiner* — Xiaobei Wang
(74) *Attorney, Agent, or Firm* — Charles A. Greene

(57) ABSTRACT

Disclosed are high-porosity cordierite honeycomb substrates having a narrow pore size distribution, little or no microcracking, and high thermal shock resistance. The porous ceramic honeycomb substrates generally comprise a primary cordierite ceramic phase as defined herein. Also disclosed are methods for making and using the cordierite substrates.

19 Claims, 14 Drawing Sheets

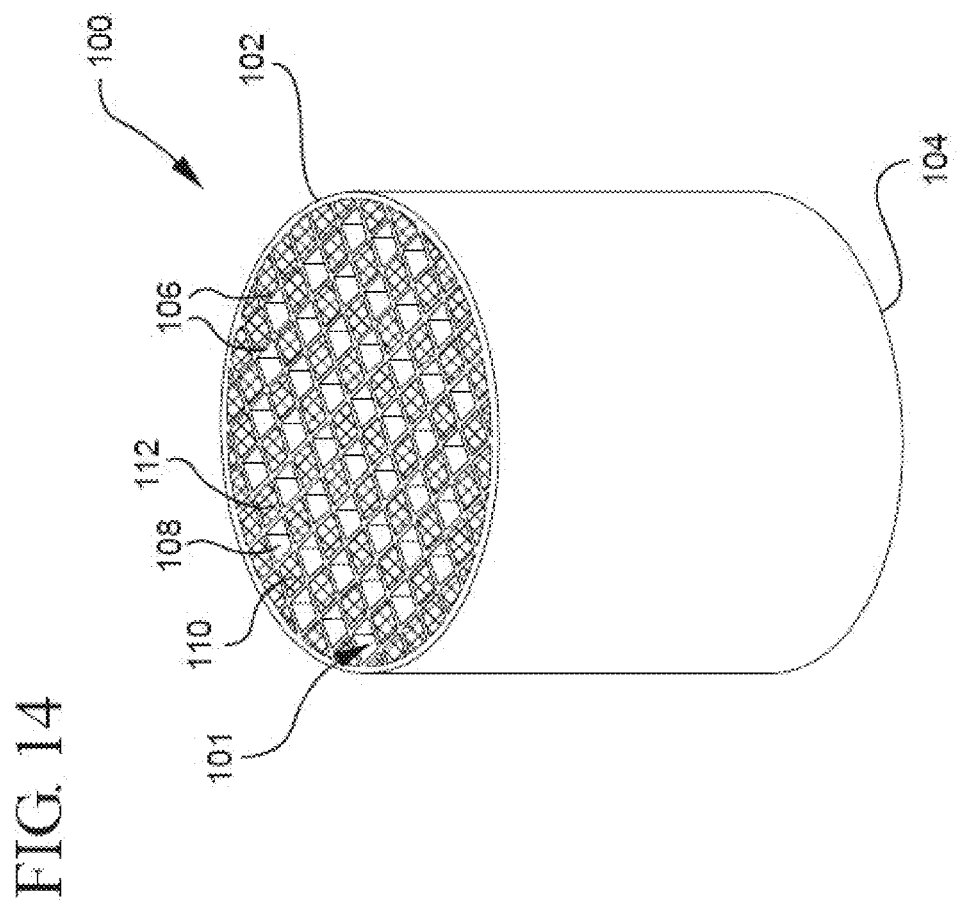

STABILIZED LOW-MICROCRACKED CERAMIC HONEYCOMBS AND METHODS THEREOF

CROSS-REFERENCE TO RELATED APPLICATION

This application claims the benefit of priority to U.S. Provisional Application Ser. No. 61/067,751, filed on Feb. 29, 2008.

FIELD

The disclosure relates to porous honeycomb ceramics and methods of making, and more particularly to porous cordierite honeycomb ceramics useful in catalytic converters and particulate filters, such as for engine exhaust after-treatment.

BACKGROUND

Porous ceramic honeycomb structures are widely used as catalytic converter substrates and/or diesel particulate filters. The earliest cordierite ceramic honeycombs for these applications consisted of reaction-sintered cordierite substrates prepared from extruded mixtures of talc, alumina, and kaolin such as described in U.S. Pat. No. 3,885,977, for example. These were found to have suitable chemical durability, inertness, refractoriness, and thermal shock resistance for the application, and were generally cost effective to manufacture. For purposes of the present description the term "cordierite" used alone refers to orthorhombic cordierite (orthorhombic $Mg_2Al_4Si_5O_{18}$ and its solid solutions), indialite (hexagonal $Mg_2Al_4Si_5O_{18}$ and its solid solutions), and mixtures thereof unless expressly stated otherwise.

SUMMARY

The disclosure provides high-porosity cordierite honeycombs (such as substrates or particulate filters) having little or no microcracking, and that can maintain a high thermal shock resistance even with an increased coefficient of thermal expansion that is expected in the absence of microcracking. A lower level of microcracking tends to increase the maximum strength achievable in the ceramic matrix itself.

The disclosure provides honeycomb bodies having improved strength that makes them excellent choices for the fabrication of, for example, catalytic converter substrates, diesel oxidation catalyst substrates, NOx adsorber substrates, hot gas particulate filters such as diesel particulate filters (DPFs), and gasoline engine particulate filters (GPFs), etc. The present invention may be used especially for honeycombs having very thin walls, together with, if desired, low cell densities for reduced back pressure and/or reduced thermal mass (faster light-off). The improved strength can also enable the manufacture of ceramic bodies having higher porosities for use in converter substrates, DPFs and GPFs for further reduction in thermal mass, for reduced pressure drop, or for storage of high amounts of catalyst (such as for SCR or 4-way catalyzed DPFs) while maintaining adequate strength.

In embodiments, the porous cordierite ceramic honeycomb bodies exhibit high thermal shock resistance and little or no microcracking even after prolonged exposure to high temperature. More specifically, the ceramic honeycomb bodies exhibit a porosity of at least 40%; a thermal shock parameter defined as $(MOR_{25°\,C.}/E_{25°\,C.})(CTE_{500-900°\,C.})^{-1}$ of at least 450° C.; and at least one of an elastic modulus ratio $E_{900°\,C.}/E_{25°\,C.}$ of $\leq 0.99$ and a microcrack parameter $Nb^3 \leq 0.07$, as measured in the axial direction of the honeycomb, both before and after exposure to 1050° C. for 100 hours in air. A porosity $\geq 40\%$ has been found to be beneficial for a higher ratio of $MOR_{25°\,C.}/E_{25°\,C.}$, which can provide improved thermal shock resistance in a non-microcracked cordierite ceramic body. Providing $(MOR_{25°\,C.}/E_{25°\,C.})(CTE_{500-900°\,C.})^{-1}$ of at least 450° C. further ensures that the honeycomb body will have good thermal shock resistance.

Among several advantages which may be provided by various embodiments, the porous honeycombs may exhibit higher strengths for a given % porosity and pore size distribution than those of more highly microcracked cordierite ceramics. The reduced microcracking may obviate the need for a passivation step prior to catalyzation, especially for DPFs, because there are few or no microcracks into which the washcoat/catalyst system can penetrate. This may allow more latitude in the design of the catalyst system and washcoating process. The improved stability against microcrack propagation after exposure to high temperatures exhibited by the inventive bodies reduces the risk of accumulation of ash or soot in microcracks during use, which may increase CTE and increase elastic modulus, thereby reducing thermal shock resistance when the body is used as a diesel particulate filter. The improved stability against microcrack propagation can also allow a high strength of the porous filter or substrate to be maintained throughout its lifetime. The increased strength and improved lifetime stability enable fabrication of honeycombs having very thin walls and/or low cell densities for reduced back pressure and/or reduced thermal mass for either faster light-off or reduction in the amount of precious metal catalyst. Additionally, increased strength may allow for higher porosities for further reduction in thermal mass, and/or higher porosities for storage of large amounts of catalyst (such as for SCR), while maintaining high strength. The increased strength and improved lifetime stability also permit higher porosities in hot gas filters such as GPFs and DPFs, and/or for higher catalyst loadings and/or reduced wall thickness while maintaining low pressure drop and high strength.

In accordance with another embodiment of the present invention, methods are provided for forming porous cordierite ceramic honeycomb bodies disclosed herein. The methods generally comprise mixing inorganic raw materials, an organic binder, and a liquid vehicle to form a plasticized batch, forming a green body from the plasticized batch, drying the green body, and firing the body to provide the cordierite ceramic structure.

Additional embodiments of the disclosure will be set forth, in part, in the detailed description, and any claims which follow, or can be learned by practice of the disclosure. The foregoing general description and the following detailed description are exemplary and explanatory only and are not restrictive.

BRIEF DESCRIPTION OF THE DRAWINGS

The accompanying drawings illustrate certain embodiments of the disclosure.

FIG. 14 is an isometric view of porous honeycomb filter.

DETAILED DESCRIPTION

Figure 1:
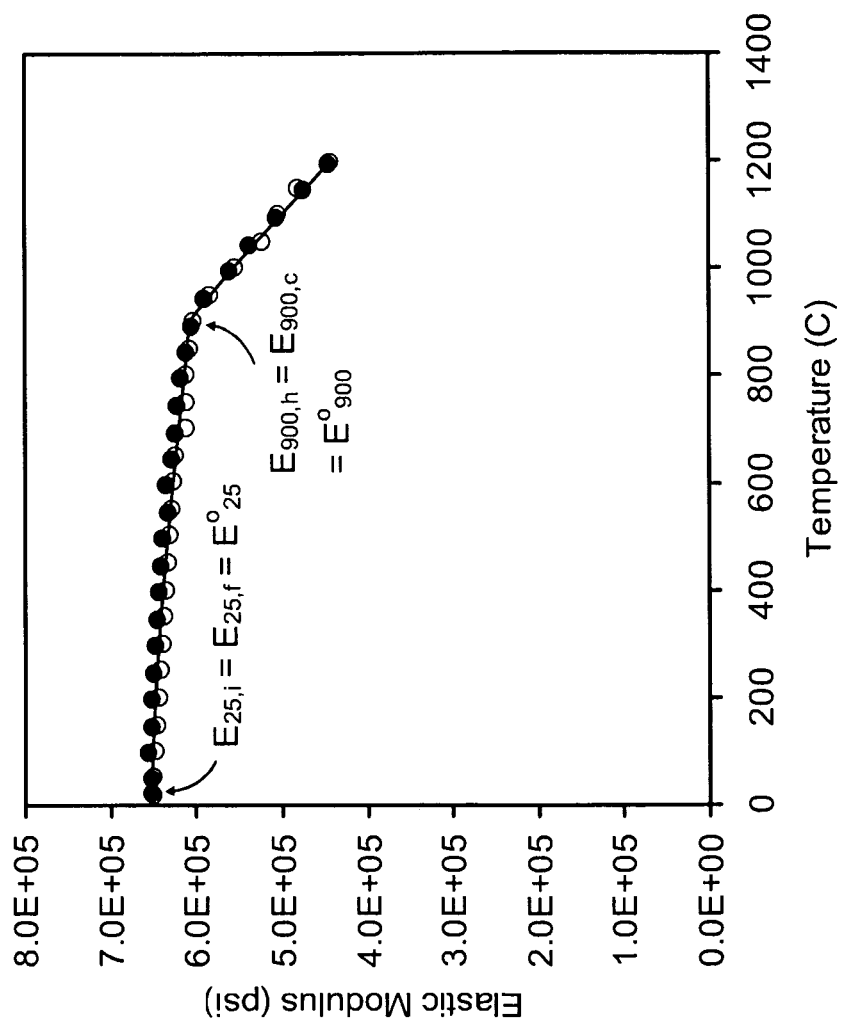
FIG. 1 depicts the elastic modulus versus temperature behavior for an inventive non-microcracked cordierite honeycomb ceramic (EX. 10.5) during heating to 1200° C. (open circles) and cooling back to room temperature (filled circles). The near overlapping of the heating and cooling trends signifies a virtual absence of microcracks. The elastic modulus decrease is essentially linear from room temperature to 900° C., with a ratio $E_{900°\,C.}/E_{25°\,C.} = 0.928$.

Various embodiments of the disclosure will be described in detail with reference to drawings, if any. Reference to various embodiments does not limit the scope of the disclosure, which is limited only by the scope of the claims attached hereto. Additionally, any examples set forth in this specification are not limiting and merely set forth some of the many possible embodiments for the claimed invention.

Disclosed are materials, compounds, compositions, and components that can be used for, can be used in conjunction with, can be used in preparation for, or are products of the disclosed method and compositions. These and other materials are disclosed herein, and when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all embodiments of this disclosure including any components of the compositions and steps in methods of making and using the disclosed compositions. Thus, if there are a variety of additional steps that can be performed each of these additional steps can be performed with any specific embodiment or combination of embodiments of the disclosed methods, and that each such combination is specifically contemplated and should be considered disclosed.

Porous cordierite ceramic honeycomb structures having high thermal shock resistance are useful for pollution control devices such as catalytic converter substrates, SCR substrates, and certain hot gas particulate filters such as diesel particulate filters (DPFs) and gasoline engine particulate filters (GPFs). In these applications, porosity in the substrate provides a means to "anchor" the washcoat or catalyst onto the surface, or within the interior, of the channel walls, and serves to filter particulates from the exhaust gas in the case of DPFs and GPFs. Historically, high thermal shock resistance in cordierite honeycomb ceramics has been achieved by maintaining a low coefficient of thermal expansion (CTE) which, in turn, is attained through microcracking and textural orientation of the cordierite crystals with their negative thermal expansion z-axes (also referred to as c-axes) oriented within the plane of the wall of the honeycomb. In a further effort to maintain a low coefficient of thermal expansion, previous approaches have also emphasized the use of highpurity raw materials low in sodium, potassium, calcium, iron, etc., in order to minimize the presence of secondary phases, especially a glass phase.

Recent trends in exhaust after-treatment for gasoline engines have, for example, placed even greater demands on the performance of catalytic converters. Specifically, converters with lower mass per unit volume are desired because such converters will heat up faster and begin catalytic conversion of the exhaust sooner, thereby resulting in lower overall emission of pollutants during a driving cycle. Lower mass can be achieved by any combination of lower cell density, thinner walls, or higher porosity. However, all of these may reduce the strength of the honeycomb substrate. Accordingly, achieving high strength in low-mass cordierite honeycombs remains a challenge because the presence of microcracks, which are necessary for very low CTE, may also reduce the strength of the ceramic. In DPFs and GPFs, higher porosity is also often desired in cases where the DPF or GPF is catalyzed. This higher porosity similarly may lower the strength of the honeycomb. High porosity is also desired for GPFs, such as for capturing the soot from the exhaust gas of lean-burn gasoline direct injection engines, to reduce pressure drop across the filter, and to provide low mass for passive regeneration during operation.

A second challenge faced by catalyzed substrates, DPFs, and GPFs comprised of a microcracked cordierite ceramic may be penetration of very fine catalyst washcoat particles into the microcracks within the cordierite matrix, or precipitation of dissolved components from the washcoat and catalyst system in the microcracks. In DPFs and GPFs, it may be possible for ash or soot particles to enter the microcracks. The presence of particles within the microcracks may interfere with the closing of the microcracks during heating, essentially pillaring the cracks open. This may result in an increase in the coefficient of thermal expansion (CTE) and may also cause an increase in elastic modulus (E), both factors which may contribute to a reduced thermal shock resistance.

Although previous efforts at improving thermal shock resistance have focused on reducing the coefficient of thermal expansion, the thermal shock resistance of a ceramic material may also be improved by increasing the ratio of the strength (such as measured by the modulus of rupture) to Young's elastic modulus, MOR/E. The quantity MOR/E is also known as the strain tolerance of the ceramic.

In embodiments, the disclosure provides a high-porosity cordierite honeycomb, such as a substrate or hot gas particulate filter such as a DPF or GPF, that exhibits little or no microcracking and maintains a high thermal shock resistance even with an increase in the coefficient of thermal expansion that occurs in the absence of microcracking. Such a honeycomb exhibits improved strength, and also possesses a thermal shock resistance that is less sensitive to the presence of the washcoat and catalyst. In still further embodiments, the cordierite honeycomb, such as a substrate, DPF, or GPF, etc., continues to exhibit little or no microcracking and maintains a relatively high thermal shock resistance after prolonged exposure to high temperatures or corrosive conditions.

"Include," "includes," or like terms means including but not limited to.

The singular forms "a," "an," and "the" include plural referents unless the context clearly dictates otherwise. Thus, for example, reference to a "component" includes embodiments having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the disclosure includes both embodiments including and excluding the component.

Ranges can be expressed herein as from "about" one particular value, to "about" another particular value, or "about" both values. When such a range is expressed, another embodiment includes from the one particular value, to another particular value, or both. Similarly, when values are expressed as approximations, by use of the antecedent "about," the particular value forms another embodiment. The endpoints of each of the ranges are significant both in relation to the other endpoint, and independently of the other endpoint.

"Weight percent," "wt. %," "percent by weight" or like terms referring to, for example, a component, unless specifically stated to the contrary, refers to the ratio of the weight of the component to the total weight of the composition in which the component is included, expressed as a percentage.

In embodiments, the porous ceramic honeycomb bodies exhibit relatively high levels of porosity. For example, the ceramic honeycomb bodies of the disclosure may have a total porosity % $P \geq 40\%$ such as a total porosity (% P) of the porous body of at least 45%, at least 50%, and even at least 55%. Additionally or alternatively, the ceramic honeycomb bodies of the disclosure can have a total porosity % $P \geq 46\%$, % $P \geq 48\%$, % $P \geq 52\%$, % $P \geq 54\%$, % $P \geq 56\%$, or even % $P \geq 58\%$. In embodiments, the ceramic honeycomb bodies of the disclosure may have a % $P \geq 60\%$ or even % $P \geq 65\%$. In particular embodiments, the ceramic honeycomb bodies of the disclosure have high strength and a total porosity % $P \leq 55\%$, and in some of these embodiments % $P \leq 54\%$, and in some of these embodiments % $P \leq 52\%$.

In embodiments, the high total porosity can preferably be comprised of a network of interconnected pores having a predetermined pore size distribution. For example, in embodiments the porosity can be characterized by a relatively narrow pore size distribution. A narrow pore size distribution can provide low soot-loaded pressure drop and can enable high filtration efficiency when the body is used as a particulate filter. The relative narrowness of the pore size distribution of the porosity of the porous body of the disclosure can be characterized by a calculation of $d_f$ or $d_b$, wherein $d_f = (d_{50} - d_{10})/d_{50}$ and $d_b = (d_{90} - d_{10})/d_{50}$. The parameters $d_{10}$, $d_{50}$, and $d_{90}$ in these equations are conventionally used and defined herein as the pore diameters at which 10%, 50%, and 90%, respectively, of the pore volume of the material resides in pores of smaller pore diameter, as measured by standard mercury porosimetry. Thus, $d_{10} < d_{50} < d_{90}$ in these measurements. In embodiments, values for $d_f$ can include, for example, $d_f \leq 0.50$, $d_f \leq 0.45$, $d_f \leq 0.40$, $d_f \leq 0.35$, $d_f \leq 0.30$, and even $d_f \leq 0.25$. Low values of $d_f$ are desirable because they tend to result in a low pressure drop during the early stages of soot-loading of a filter and/or tend to result in a higher strain tolerance.

As noted above, the narrow pore size distribution can also be characterized by the overall breadth of the pore size distribution as defined by the equation $d_b = (d_{90} - d_{10})/d_{50}$. To that end, a low value for $d_b$ can correlate to a relatively high strain tolerance, high strength and high filtration efficiency. For example, values of $d_b$ can include $d_b \leq 1.20$, $d_b \leq 1.10$, $d_b \leq 1.00$, $d_b \leq 0.90$, $d_b \leq 0.80$, or even $d_b \leq 0.70$.

The preferred values of the median pore diameter depend upon the application of the honeycomb ceramic. For example, when the ceramic is used as a substrate in which a catalyst is to be applied to the walls of the channels of the honeycomb, the median pore diameter is preferably at least 0.5 microns, and especially preferably at least 1 micron, and is also preferably not greater than 10 microns, and even more preferably not greater than 6 microns. When the honeycomb body is to be used as a gasoline particulate filter, it is preferred that the median pore diameter is at least 5 microns, and is preferably at least 6 microns, 7 microns, 8 microns, 9 microns, and even 10 microns, but is preferably not more than 20 microns, and more preferably is not more than 16 microns, 14 microns, and even not more than 12 microns. When the honeycomb body is to be used as a diesel particulate filter, it is preferred that the median pore diameter is at least 8 microns, 9 microns, and even 10 microns, but is preferably not more than 30 microns, and more preferably is not more than 25 microns, 22 microns, and even not more than 20 microns.

In embodiments, the porosity can be further characterized by the pore connectivity factor (PCF) of the interconnected network of pores, where PCF=(% P)/[($d_{90}-d_{10}$)/$d_{50}$]. A high value for the pore connectivity factor can be desirable because the high values can correlate to relatively high strain tolerance and thermal shock resistance. In exemplary embodiments, values of PCF can include PCF$\geq$60, PCF$\geq$70, PCF$\geq$80, PCF$\geq$85, and even PCF$\geq$90.

The durability of the disclosed ceramic articles under thermal shock conditions can also be characterized by the calculation of a thermal shock parameter (TSP). More specifically, TSP is an indicator of the maximum temperature difference a body can withstand without fracturing when the coolest region of the body is at about 500° C. Thus, for example, a calculated TSP of about 558° C. implies that the maximum temperature at some position within the honeycomb body must not exceed 1058° C. when the coolest temperature at some other location within the body is 500° C. The thermal shock parameter is calculated according to the equation TSP= $(MOR_{25° C.}/E_{25° C.})(CTE_{500-900° C.})^{-1}$ wherein $MOR_{25° C.}$ is the modulus of rupture strength at 25° C., $E_{25° C.}$ is the Young's elastic modulus at 25° C., and $CTE_{500-900° C.}$ is the mean thermal expansion coefficient from 500° C. to 900° C. as measured during heating of a honeycomb sample parallel to the length of the channels. When computing the ratio of $(MOR_{25° C.}/E_{25° C.})$, it is to be understood that the specimens on which MOR and elastic modulus are measured are of the same cell geometry.

The modulus of rupture, MOR, is measured by the four-point method on a cellular bar, such as either about 0.5×1.0×5.0 inches or about 0.25×0.5×2.75 inches, whose length is parallel to the channels of the honeycomb. The MOR is a measure of the flexural strength of the honeycomb body. A high value of MOR is desired because this corresponds to greater mechanical durability of the body and higher thermal durability and thermal shock resistance. A high value of MOR also yields higher values for the thermal shock parameter, $(MOR_{25° C.}/E_{25° C.})(CTE_{500-900° C.})^{-1}$ and strain tolerance, $(MOR_{25° C.}/E_{25° C.})$.

Figure 12:
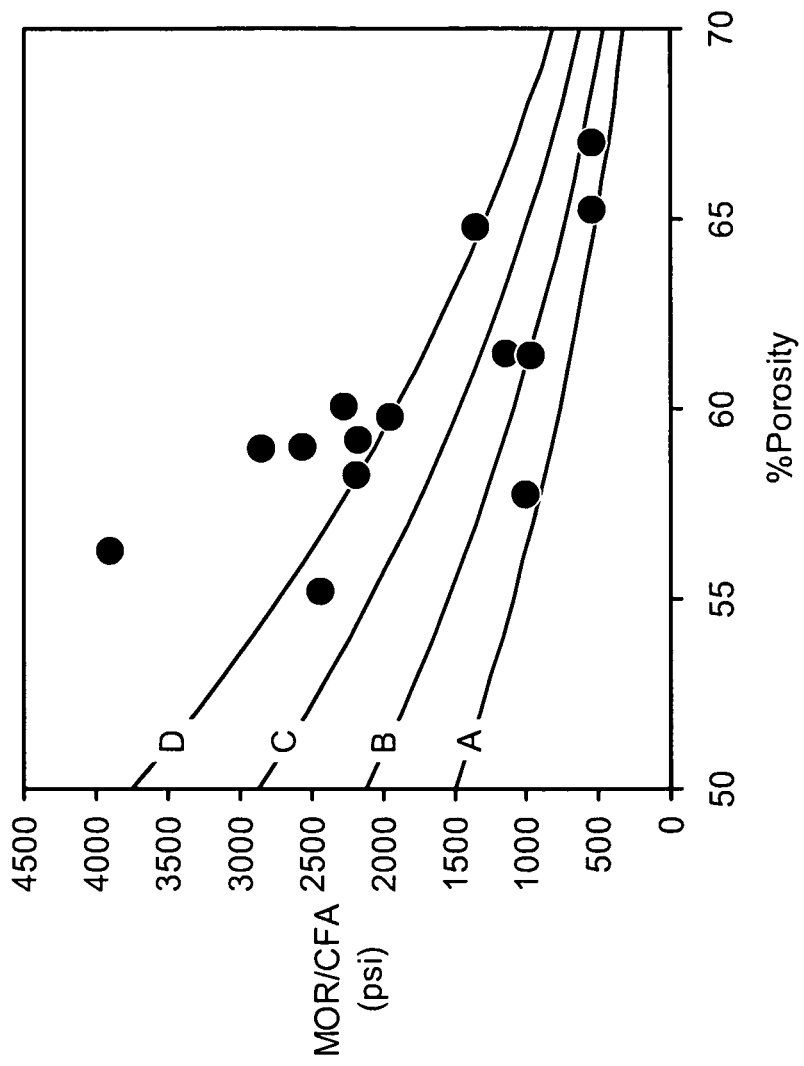
FIG. 12 plots the ratio of the modulus of rupture divided by CFA in psi versus the % Porosity for inventive examples.

When measured on cellular bodies the values of MOR are proportional to the closed frontal area (CFA) of a cross section of the cellular body taken transverse to the axial direction of the honeycomb structure. The closed frontal area of the sample is defined as the fraction of the total cross sectional area that is comprised of porous ceramic material, and is defined by the relation CFA=t(2L-t)/$L^2$, where t is the thickness of the honeycomb wall and L is the distance between the centers of the wall intersections, in which L=(cell density)$^{-1/2}$. The cell density is the number of channels per unit area of the face of the honeycomb; cell density is reported herein in cpsi which stands for cells per square inch. According to embodiments, the value of MOR/CFA, where CFA is the closed frontal area of the specimen, is preferably at least 12000(1-p)$^3$ psi, more preferably at least 17000(1-p)$^3$ psi, and still more preferably at least 23000(1-p)$^3$ psi, and even more preferably 30000(1-p)$^3$ psi, where p=% porosity/100, as shown by curves A, B, C, and D, respectively, in FIG. 12.

The elastic modulus (Young's modulus), E, is measured by a sonic resonance technique either along the axial direction of a 0.5×1.0×5.0 inch honeycomb specimen or along the length of a 0.25×5.0 inch cylindrical rod. The elastic modulus is a measure of the rigidity of the body. A low value of E is desired because this corresponds to greater flexibility of the body and higher thermal durability and thermal shock resistance. A low value of E also yields higher values for the thermal shock parameter, $(MOR_{25° C.}/E_{25° C.})(CTE_{500-900° C.})^{-1}$. The value $E_{25° C.}$ is the elastic modulus of the specimen at or near room temperature before heating of the specimen. $E_{900° C.}$ is the elastic modulus of the specimen measured at 900° C. during heating of the specimen.

The coefficient of thermal expansion, CTE, is measured by dilatometry along the axial direction of the specimen, which is the direction parallel to the lengths of the honeycomb channels. As noted above, the value of $CTE_{500-900° C.}$ is the mean coefficient of thermal expansion from 500 to 900° C. Similarly, the value of $CTE_{25-800° C.}$ is the mean coefficient of thermal expansion from 25 to 800° C., and the value of $CTE_{200-1000° C.}$ is the mean coefficient of thermal expansion from 200 to 1000° C., all as measured during heating of the sample. A low value of CTE is desired for high thermal durability and thermal shock resistance. A low value of CTE yields higher values for the thermal shock parameter, $(MOR_{25° C.}/E_{25° C.})(CTE_{500-900° C.})^{-1}$.

In embodiments of the disclosure, it is preferred that the thermal shock parameter values of the honeycomb bodies be TSP$\geq$450° C., TSP$\geq$500° C., TSP$\geq$550° C., and even TSP$\geq$600° C. In other embodiments, the thermal shock parameter values can be TSP$\geq$700° C., TSP$\geq$750° C., TSP$\geq$800° C., and even TSP$\geq$850° C. From these exemplary TSP values in embodiments of the disclosure, the Thermal Shock Limit (TSL) of ceramic honeycomb bodies can be calculated. As noted above, the thermal shock limit is conventionally considered to be the maximum temperature to which the center of the body can be heated when the surface of the body is 500° C., without suffering cracking damage. TSL can be estimated by adding 500° C. to the value of Thermal Shock Parameter (TSP) as according to TSL=TSP+500° C.

In embodiments, a large proportion of highly interconnected pores have a narrow pore size distribution and may contribute importantly to the high strain tolerance and high TSP values obtained. High pore interconnectivity in these low microcracked ceramics has the effect of reducing elastic modulus values to a greater extent than MOR values. Thus, the strain tolerance $(MOR_{25° C.}/E_{25° C.})$ also denoted $(MOR/E)_{25° C.}$, upon which the TSP value depends, can be favorably impacted by the amount of porosity and narrowness of the pore size distribution of these low microcracked ceramics. In embodiments, a relatively high strain tolerance or ratio of $(MOR/E)_{25° C.}$ is provided, where $(MOR/E)_{25° C.}\geq$0.12%, $(MOR/E)_{25° C.}\geq$0.13%, $(MOR/E)_{25° C.}\geq$0.14%, $(MOR/E)_{25° C.}\geq$0.15%, $(MOR/E)_{25° C.}\geq$0.16%, $(MOR/E)_{25° C.}\geq$0.17%, $(MOR/E)_{25° C.}\geq$0.18%, $(MOR/E)_{25° C.}\geq$0.19%, or even $(MOR/E)_{25° C.}\geq$0.20%.

The presence of a residual glass phase in the inventive ceramic bodies can serve to further reduce the microcracking and increase the strain tolerance $(MOR/E)_{25° C.}$ of the body, and thereby increase its thermal shock resistance. This is in contrast to the teachings of previous studies of highly microcracked cordierite ceramic bodies in which the amount of glass phase is sought to be minimized. Thus, in embodiments of the disclosure, the porous cordierite ceramic honeycomb body can contain a residual glass phase comprised of one or more metal oxides other than the MgO, $Al_2O_3$, and $SiO_2$ metal oxides found in cordierite. These metal oxides are preferably selected from the group comprised of alkali metal oxides, alkaline earth metal oxides other than magnesium, rare earth metal oxides including yttrium oxide and lanthanum oxide, and transition metal oxides including those of iron, titanium, manganese, and zinc. In some embodiments, the porous cordierite ceramic honeycomb body comprises at least 1.0 wt % total metal oxides other than MgO, $Al_2O_3$, and $SiO_2$. In alternative or additional embodiments, the sum of the metal oxides exclusive of MgO, $Al_2O_3$, and $SiO_2$ is more preferably at least 1.5 wt %, at least 2.0 wt %, and even at least 3.0 wt %.

It is also contemplated that the porous ceramic honeycomb body can, in addition to the primary cordierite phase, comprise one or more secondary ceramic phases, including for example one or more mullite, spinel, sapphirine, or corundum phases. However, in these embodiments, it can be desirable for the weight percentage of the secondary ceramic phase to be less than 10 wt %, or more preferably less than 5 wt. %, less than 4 wt. %, less than 3 wt. %, and even less than 2 wt. %, as measured by X-ray diffractometry. Higher amounts of these secondary crystalline phases can increase the CTE without substantially increasing the strain tolerance, thereby decreasing the overall thermal shock resistance of the honeycomb body.

The honeycomb bodies of the disclosure can possess a microstructure in which the cordierite crystallites are preferentially oriented with their negative-CTE crystallographic z-axes parallel to the plane of the honeycomb wall. A high degree of such orientation can be desirable because it reduces the CTE of the honeycomb article in both the axial direction (within the plane of the wall, parallel to the lengths of the channels) and radial direction (within the plane of the wall, orthogonal to the lengths of the channels). The degree of preferred crystal orientation is measured by x-ray diffractometry on a specimen cut from the fired body. An "XRD I-ratio" is defined by the relation of EQ. 1

$$\text{I-ratio} = I(110)/[I(110) + I(002)] \qquad \text{EQ. 1}$$

where I(110) and I(002) are the peak heights of the XRD reflections from the (110) and (002) planes in the cordierite crystal lattice, based upon hexagonal indexing of the XRD peaks, using copper Kα radiation. The "axial I-ratio," $I_A$, is measured by x-ray diffractometry on the axial cross section of the honeycomb, that is, the cross section orthogonal to the length of the channels. The "transverse I-ratio," $I_T$, is measured on the as-fired surface of the honeycomb wall, with the orthogonal walls removed. The axial and transverse I-ratios provide a quantitative measure of the degree to which the cordierite crystallites in the honeycomb article are oriented with their negative thermal expansion z-axes parallel to the plane of the honeycomb wall. A high degree of such orientation is desirable because it reduces the CTE of the honeycomb article in both the axial direction (within the plane of the wall, parallel to the lengths of the channels) and radial direction (within the plane of the wall, orthogonal to the lengths of the channels). For randomly oriented cordierite crystals, the axial and transverse I-ratios are both approximately 0.655. Values of the axial I-ratio lower than 0.655 and values of the transverse I-ratio greater than 0.655 indicate that the cordierite crystals are preferentially oriented with their z-axes parallel to the plane of the wall. Larger differences between $I_T$ and $I_A$ correspond to greater degrees of this preferred orientation. Such orientation increases the thermal shock resistance of the article by lowering the CTE in the axial and radial directions.

Near-random orientations are exemplified by cordierite crystallites in walls of the honeycomb structure having a $\Delta I \leq 0.05$ wherein $\Delta I = I_T - I_A$. In contrast, cordierite crystallites in walls of the low-microcracked honeycomb structure of the disclosure which have a preferred orientation can have a $\Delta I > 0.05$. In accordance with certain embodiments, the ceramic honeycomb body possesses an axial XRD I-ratio, $I_A$, and a transverse XRD I-ratio, $I_T$, such that the difference $\Delta I = (I_T - I_A)$ is greater than 0.05. In preferred embodiments, the value of $\Delta I$ is at least 0.08, 0.10, 0.12, 0.14, 0.16, 0.18, and even at least 0.20. It is further preferred that the axial I-ratio is not more than 0.60, and more preferably not more than 0.58, 0.56, 0.54, 0.52, 0.50, and even not more than 0.48. A lower axial I-ratio indicates a greater proportion of the cordierite crystals oriented with their negative-CTE z-axes within the plane of the wall, thereby imparting a lower CTE to the honeycomb body in both the axial and radial directions, and increasing the thermal shock resistance of the body. It is also preferred that the transverse I-ratio is not less than 0.70, and more preferably not less than 0.72, 0.74, 0.76, 0.78, even not less than 0.80. In certain embodiments, the cordierite crystals may exhibit a slight degree of "reverse" orientation, in which the fraction of crystals with their z-axes orthogonal to the channel wall surface is slightly greater than the fraction of crystals with their z-axes lying within the plane of the channel wall. In such cases, the axial I-ratio can be greater than 0.66, 0.68, and even greater than 0.70; the transverse I-ratio can be less than 0.64, 0.62 and even 0.60; and the value of $\Delta I = (I_T - I_A)$ is less than zero and can be more negative than −0.02, −0.04, −0.06, −0.08, and even more negative than −0.10. Although slight reverse orientation causes an increase in the axial CTE, this can be outweighed by the benefit in stability against microcrack propagation after exposure to high temperatures.

To preserve good thermal shock resistance, the average coefficient of thermal expansion of the cordierite ceramic honeycomb body over the 25° C.-800° C. (hereinafter the CTE) should be relatively low. Accordingly, a CTE$\leq$21.0× $10^{-7}$/° C. along the axial direction (in the extrusion direction, i.e., along the length of the channel) in the ceramic body may be exhibited in embodiments of the disclosure. In embodiments, a CTE$\leq$18.0×$10^{-7}$/° C., a CTE$\leq$16.0×$10^{-7}$/° C., a CTE$\leq$15.0×$10^{-7}$/° C., or even a CTE$\leq$14.0×$10^{-7}$/° C. along the axial direction are provided. In embodiments of the low-microcracked honeycombs, the coefficient of thermal expansion of the cordierite ceramic honeycomb body along the axial direction over the temperature range can have a CTE$\leq$12.0×$10^{-7}$/° C., or even a CTE$\leq$11.0×$10^{-7}$/° C. In embodiments, a CTE in the range of about 10.5×$10^{-7}$/° C. to about 18.0×$10^{-7}$/° C. can be provided, including for example a CTE in the range of from about 10.5×$10^{-7}$/° C. to about 14.0×$10^{-7}$/° C. In other embodiments, CTE$\geq$12.0×$10^{-7}$/° C., CTE$\geq$14.0×$10^{-7}$/° C., or even CTE$\geq$16.0×$10^{-7}$/° C.

The microcrack parameter $Nb^3$ and the $E_{ratio} = E_{900° C.}/E_{25° C.}$ are measures of the level of microcracking in ceramic bodies, such as cordierite ceramics. To that end, for a low-microcracked cordierite body, the elastic modulus gradually decreases with increasing temperature. This decrease in the elastic modulus is, without intending to be limited by theory, believed to be attributable to the increasing distance between atoms within the crystal structure with increasing temperature. An example of the decrease in elastic modulus with increasing temperature for a porous, non-microcracked cordierite honeycomb body is depicted in FIG. 1. In particular, the elastic modulus versus temperature behavior for the non-microcracked cordierite honeycomb ceramic of Example 10.5 during heating to 1,200° C. (open circles) and cooling back to room temperature (filled circles) is illustrated in FIG. 1. The near overlap of the heating and cooling trend lines signifies a virtual absence of microcracks. The elastic modulus decrease has been found to be essentially linear from room temperature to 900° C., or even to 1000° C. Above about 1,000° C., there is a greater rate of decrease in elastic modulus with increasing temperature. This is believed to be due to the softening, or even partial melting, of a small amount of residual glass phase that originally formed by reaction of impurities or glass-forming metal oxide additions during sintering of the ceramic. Surprisingly, the rate of change in the elastic modulus with heating for a non-microcracked cordierite ceramic, $\Delta E°/\Delta T$, was found to be proportional to the value of the elastic modulus of the non-microcracked body at room temperature, $E°_{25° C.}$, and is closely approximated by the relation of EQ. 2:

$$\Delta E°/\Delta T(\text{psi}/° C.) = -7.5 \times 10^{-5}(E°_{25° C.})$$ EQ. 2 where the superscript "°" elastic modulus term (E°) denotes the elastic modulus of the ceramic in a non-microcracked state. For non-microcracked cordierite bodies, the temperature dependence of the elastic modulus during cooling after heating to a high temperature, such as 1,200° C., is essentially identical to the temperature dependence during the original heating, so that, at any given temperature, the value of the elastic modulus during cooling is nearly the same as its value at that temperature during heating. This is also illustrated in FIG. 1 for a low-microcracked cordierite ceramic. Based upon EQ. 2, one can calculate the ratio of the elastic modulus of a non-microcracked cordierite body at 900° C. to that of a non-microcracked cordierite body at 25° C. as being $E°_{900° C.}/E°_{25° C.} = 1+875(-7.5 \times 10^{-5}) = 0.934$.

Figure 2:
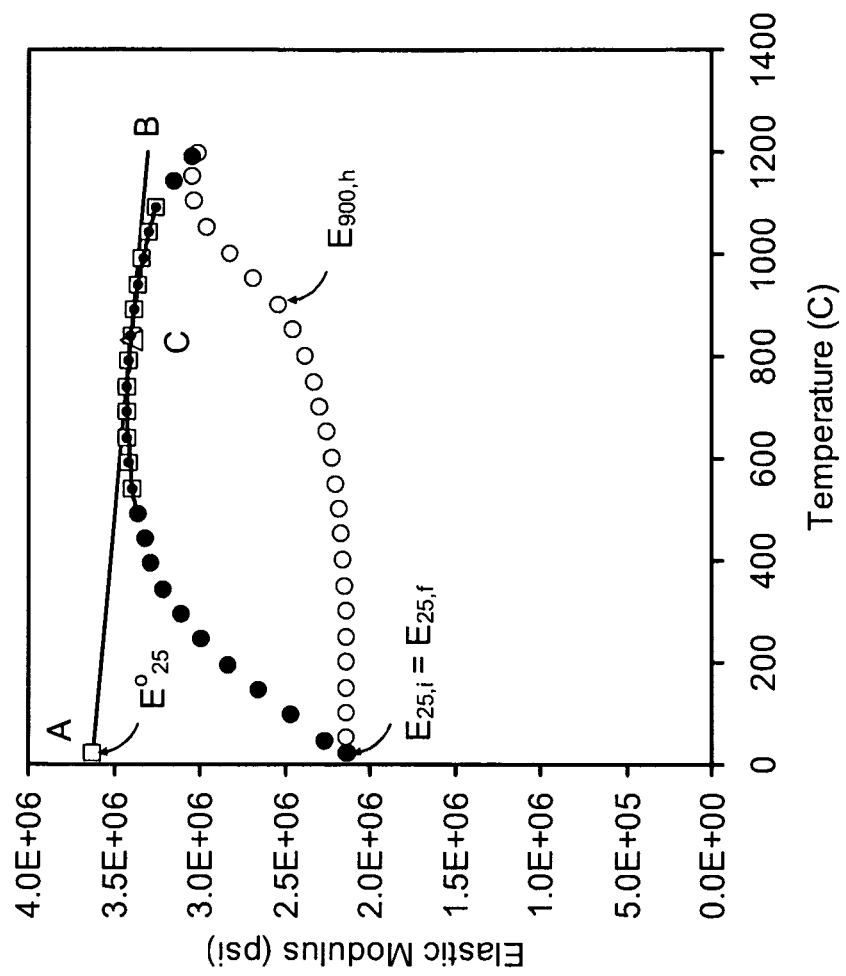
FIG. 2 illustrates the elastic modulus versus temperature behavior for a comparative microcracked cordierite honeycomb ceramic (EX. 9.4) during heating to 1200° C. (open circles) and cooling back to room temperature (filled circles). Curve through the open squares with central dots denotes polynomial curve fit to those points. Line A-B represents a tangent to the polynomial through the elastic modulus cooling curve at point C (open triangle) where the slope of the curve is equal to $-7.5 \times 10^{-5}(E°_{25})$, and $E°_{25}$ is the value of the tangent line at room temperature.

The temperature dependence of the elastic modulus for a highly microcracked cordierite ceramic body is also reflected in FIG. 2. Thus, FIG. 2 shows the elastic modulus versus temperature behavior for the microcracked cordierite honeycomb ceramic of Example 9.4 during heating to 1,200° C. (open circles) and cooling back to room temperature (filled circles).

In a highly microcracked ceramic body, the elastic modulus increases gradually, and then more steeply, with increasing temperature up to 1,200° C. This increase is believed to be due to the re-closing, and eventual annealing, of the microcracks with heating, so that the ceramic body has progressively fewer open microcracks at higher temperatures. The increase in E due to the reduction in microcracking more than offsets the decrease in E of the individual cordierite crystallites with heating, resulting in a more rigid body at high temperature. As the ceramic is cooled from 1,200° C., the microcracks do not immediately re-open, because micro-stresses are initially too low. As a result, the trend in elastic modulus with cooling is initially that of a non-microcracked cordierite body. The increase is steep at first due to the increase in viscosity of any liquid or glass phase, possibly accompanied by a reduction in volume fraction of the liquid or glass due to crystallization or devitrification, respectively. Between about 1,000 and 800° C. in the example in FIG. 2, the more gradual increase in E with decreasing temperature can be ascribed to the natural increase in the elastic modulus of the cordierite crystals with cooling. At temperatures below about 800° C., the elastic modulus undergoes a gradual, then more rapid, decrease with cooling. This is due to the progressive re-opening of the microcracks and a decrease in the rigidity of the ceramic. At room temperature, the elastic modulus has returned to a value close to the initial value of the ceramic before the thermal cycle to 1,200° C.

The extent of microcracking in the cordierite ceramic can be reflected in two features of the elastic modulus heating and cooling curves. One manifestation of the degree of microcracking is the extent to which the elastic modulus increases from 25° C. to 900° C. during heating, as this increase is believed to be caused by a re-closing of the microcracks. For example, in FIG. 1, the ratio $E_{900° C.}/E_{25° C.}$ is about 0.928 indicating a very low degree of microcracking. By contrast, in FIG. 2, the ratio of $E_{900° C.}/E_{25° C.}$ for the heating curve is 1.19. This value is much higher than would be expected in the complete absence of microcracking. Thus, the value of $E_{900° C.}/E_{25° C.}$ for a cordierite ceramic may be utilized as a quantitative measure of the extent of microcracking in the room-temperature body.

According to embodiments of the disclosure $E_{900° C.}/E_{25° C.} \leq 0.99$, $E_{900° C.}/E_{25° C.} \leq 0.98$, $E_{900° C.}/E_{25° C.} \leq 0.97$, $E_{900° C.}/E_{25° C.} \leq 0.96$, $E_{900° C.}/E_{25° C.} \leq 0.95$, $E_{900° C.}/E_{25° C.} \leq 0.94$, and even $E_{900° C.}/E_{25° C.} \leq 0.93$. To that end, it should be noted that the minimum achievable value for $E_{900° C.}/E_{25° C.}$ for a ceramic comprised of 100% cordierite is about 0.93 when the body is entirely absent of microcracks. When a glass phase is also present in the cordierite ceramic body, the value of $E_{900° C.}/E_{25° C.}$ can be even less than 0.93 due to reduction in $E_{900° C.}$ by softening of the glass at high temperature.

Another indication of the degree of microcracking is the gap between the elastic modulus heating and cooling curves. A method to quantify this hysteresis is based upon the construction of a tangent to the cooling curve in a temperature region where the sample is still in a non-microcracked state. In FIG. 2, such a tangent is shown as line A-B, and the point of tangency is denoted by point "C". The slope of the tangent line is, therefore, equivalent to the temperature dependence of the elastic modulus of the non-microcracked cordierite body, as constrained by EQ. 2. Furthermore, the value of this tangent line extrapolated back to room temperature (point A) is approximately equivalent to the room-temperature elastic modulus of the sample if it were not microcracked at room temperature, and is equal to $E°_{25° C.}$ for that sample. Thus, the equation of the tangent line is given by the following general expression of EQ. 3:

$$E°_{tangent} = (E°_{25° C.})\{1-7.5 \times 10^{-5}(T-25)\}$$ EQ. 3

Where $E°_{tangent}$ in units of psi denotes the elastic modulus of the non-microcracked body at each temperature, T, along the tangent line.

An analytical method was devised for determining $E°_{25° C.}$ from the experimental measurements of the elastic modulus during cooling, after heating to about 1,200° C. In accordance with this method, a second-order polynomial is fit to the elastic modulus measurements made during cooling between about 1,000° C. and 500° C., as a function of temperature (° C.). This equation is of the following form:

$$E = c + b(T) + a(T^2)$$ EQ. 4

The upper limit of the temperature range over which the experimentally measured elastic modulus values are fit by EQ. 4 may be further restricted to a temperature less than 1000° C. if it is determined that the trend in E versus temperature exhibits a very high curvature at, or below, about 1000° C., due to, for example, the persistence of substantial softening of a glass phase or formation of a small amount of liquid below 1,000° C. Likewise, the lower limit of the temperature range over which the experimentally measured elastic modulus values are fit by EQ. 4 may be further restricted to a temperature greater than 500° C. if it is determined that the trend in E versus temperature exhibits a very high curvature at, or above, about 500° C., due to, for example, substantial reopening of the microcracks above 500° C. The method of least-squares regression analysis is used to derive the values of the regression coefficients "a," "b," and "c" in EQ. 4. In FIG. 2, the polynomial fit to the open squares is represented by the solid curve from 500 to 1,100° C.

The value of $E°_{25° C.}$ is obtained by solving for the elastic modulus and temperature at which the tangent line, given by EQ. 3, intersects the polynomial curve fit to the elastic modulus data during cooling, given by EQ. 4. The values of the elastic modulus and temperature at this point of intersection are denoted $E_i$ and $T_i$, respectively. In the example in FIG. 2, the values of $E_i$ and $T_i$ correspond to the triangle, point C. Because this point of intersection is common to both the tangent line and the polynomial curve, it follows that $$E_i = (E°_{25° C.})\{1 - 7.5 \times 10^{-5}(T_i - 25)\} = c + b(T_i) + a(T_i^2) \qquad \text{EQ. 5}$$

Also, at the point of tangency, the slope of the polynomial curve must equal that of the tangent line. Therefore, it follows that $$(E°_{25° C.})(-7.5 \times 10^{-5}) = b + 2a(T_i) \qquad \text{EQ. 6}$$

EQ. 5 and EQ. 6 provide two equations relating the two unknown quantities, $E°_{25° C.}$ and $T_i$, to one another. To solve for $E°_{25° C.}$ and $T_i$, EQ. 6 is first rearranged to yield $$(E°_{25° C.}) = \{b + 2a(T_i)\}/(-7.5 \times 10^{-5}) \qquad \text{EQ. 7}$$

EQ. 7 is then substituted into EQ. 5 to give the following expression:

$$\{\{b + 2a(T_i)\}/(-7.5 \times 10^{-5})\}\{1 - 7.5 \times 10^{-5}(T_i - 25)\} = c + b(T_i) + a(T_i^2) \qquad \text{EQ. 8}$$

EQ. 8 may be rearranged to yield the following:

$$0 = \{c + b(T_i) + a(T_i^2)\} - \{\{b + 2a(T_i)\}/(-7.5 \times 10^{-5})\}\{1 - 7.5 \times 10^{-5}(T_i - 25)\} \qquad \text{EQ. 9}$$

Gathering terms in EQ. 9 gives the following relation:

$$0 = \{c - \{b/(-7.5 \times 10^{-5})\}\{1 + 7.5 \times 10^{-5}(25)\}\} + (T_i)(b) - (T_i)\{2a/(-7.5 \times 10^{-5})\}\{1 + 7.5 \times 10^{-5}(25)\} - (T_i)\{\{b/(-7.5 \times 10^{-5})\}\{-7.5 \times 10^{-5}\}\} + (T_i^2)\{a - \{2a/(-7.5 \times 10^{-5})\}(-7.5 \times 10^{-5})\} \qquad \text{EQ. 10}$$

Further simplifying EQ. 10 yields $$0 = \{c - \{b/(-7.5 \times 10^{-5})\}\{1 + 7.5 \times 10^{-5}(25)\}\} + (T_i)\{-2a/(-7.5 \times 10^{-5})\}\{1 + 7.5 \times 10^{-5}(25)\} + (T_i^2)(-a) \qquad \text{EQ. 11}$$

EQ. 11 may be re-expressed as $$0 = C + B(T_i) + A(T_i^2) \qquad \text{EQ. 12}$$

where $C = \{c - \{b/(-7.5 \times 10^{-5})\}\{1 + 7.5 \times 10^{-5}(25)\}\}$, $B = \{-2a/(-7.5 \times 10^{-5})\}\{1 + 7.5 \times 10^{-5}(25)\}$, and $A = -a$. The value of $T_i$ can then be found by solving the quadratic formula:

$$T_i = \{-B + \{B^2 - 4(A)(C)\}^{0.5}\}/2A \qquad \text{EQ. 13}$$

$$T_i = \{-B - \{B^2 - 4(A)(C)\}^{0.5}\}/2A \qquad \text{EQ. 14}$$

EQ. 13 and EQ. 14 provide two possible values of $T_i$, of which only one will have a physically realistic value, that is, a value lying between 25 and 1,200° C. The physically realistic value of $T_i$ computed in this manner is then substituted into EQ. 7, from which the value of $E°_{25° C.}$ is calculated.

Once $E°_{25° C.}$ has been solved for, the ratio of the elastic modulus for the hypothetically non-microcracked sample at 25° C., $E°_{25° C.}$, to the actual measured value of the elastic modulus of the microcracked sample at 25° C., $E_{25° C.}$ is proportional to the degree of microcracking in the initial sample before heating. That is, a greater degree of microcracking at room temperature will lower the value of $E_{25° C.}$, and thereby raise the value of $E°_{25° C.}/E_{25° C.}$.

Modeling of the relationship between elastic modulus and microcracking has provided a relationship between the ratio $E°_{25° C.}/E_{25° C.}$ and the quantity $Nb^3$, where N is the number of microcracks per unit volume of ceramic and b is the diameter of the microcracks (see D. P. H. Hasselman and J. P. Singh, "Analysis of the Thermal Stress Resistance of Microcracked Brittle Ceramics," *Am. Ceram. Soc. Bull.*, 58 (9) 856-60 (1979).) Specifically, this relationship may be expressed by the following equation:

$$Nb^3 = (9/16)\{(E°_{25° C.}/E_{25° C.}) - 1\} \qquad \text{EQ. 15}$$

Although based upon a number of simplifying assumptions, the quantity $Nb^3$, referred to herein as the "Microcrack Parameter," provides another useful means to quantify the degree of microcracking in a ceramic body. For a non-microcracked body, the value of $Nb^3$ is 0.00. In the example in FIG. 2, the value of $Nb^3$ is 0.39. In embodiments, it is therefore preferred that the value of $Nb^3$ be $\leq 0.07$. In embodiments, the ceramic honeycomb bodies may exhibit microcrack parameters of $Nb^3 \leq 0.06$, $Nb^3 \leq 0.05$, $Nb^3 \leq 0.04$, $Nb^3 \leq 0.03$, $Nb^3 \leq -0.02$, or even $Nb^3 \leq 0.01$.

In addition to exhibiting the aforementioned properties in the as fired state, in embodiments the degree of microcracking remains stable over prolonged exposure to conditions encountered during end use applications. To that end, in embodiments the degree of microcracking as characterized by the ratio $E_{900° C.}/E_{25°}$ or as characterized by the microcrack parameter $Nb^3$ remains low after exposure to a temperature of about 1050° C. for at least 100 hours in air. For example, after exposure to a temperature of at least about 1050° C. for 100 hours in air embodiments of the disclosure can still exhibit an $E_{900° C.}/E_{25° C.} \leq 0.99$, $E_{900° C.}/E_{25° C.} \leq 0.98$, $E_{900° C.}/E_{25° C.} \leq 0.97$, $E_{900° C.}/E_{25° C.} \leq 0.96$, $E_{900° C.}/E_{25° C.} \leq 0.95$, $E_{900° C.}/E_{25° C.} \leq 0.94$, and even $E_{900° C.}/E_{25° C.} \leq 0.93$. Additionally or alternatively, after exposure to a temperature of about 1050° C. for at least 100 hours in air embodiments of the disclosure can still exhibit a microcrack parameter $Nb^3 \leq 0.07$, $Nb^3 \leq 0.06$, $Nb^3 \leq 0.05$, $Nb^3 \leq 0.04$, $Nb^3 \leq 0.03$, $Nb^3 \leq 0.02$, or even $Nb^3 \leq 0.01$.

It has been discovered that the strength, as measured by the modulus of rupture, can decrease after the ceramic has been exposed to 1050° C. for 100 hours. Thus, in preferred embodiments, the ratio of the MOR at room temperature after exposure to 1050° C. for 100 hours, divided by the initial MOR at room temperature before being heated to 1050° C. for 100 hours, $(MOR)_h/(MOR)_i$, may be at least 0.50, or at least 0.60, 0.70, 0.80, 0.90, or even at least 0.95.

Figure 10:
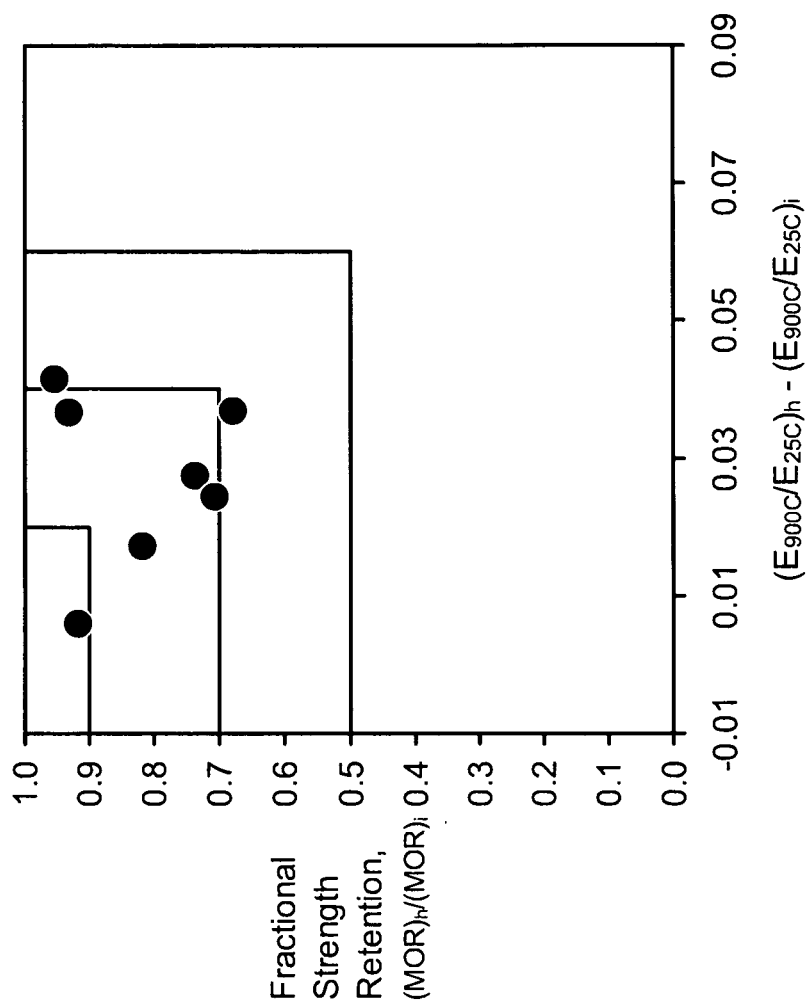
FIG. 10 plots the ratio of the modulus of rupture after holding for 100 hours at 1050° C. to the initial modulus of rupture prior to heat treatment, $(MOR)_h/(MOR)_i$, versus the difference between the elastic modulus ratio $E_{900°\,C.}/E_{25°\,C.}$ after holding for 100 hours at 1050° C. and the initial elastic modulus ratio $E_{900°\,C.}/E_{25°\,C.}$, $(E_{900°\,C.}/E_{25°\,C.})_h - (E_{900°\,C.}/E_{25°\,C.})_i$ for inventive examples.
Figure 11:
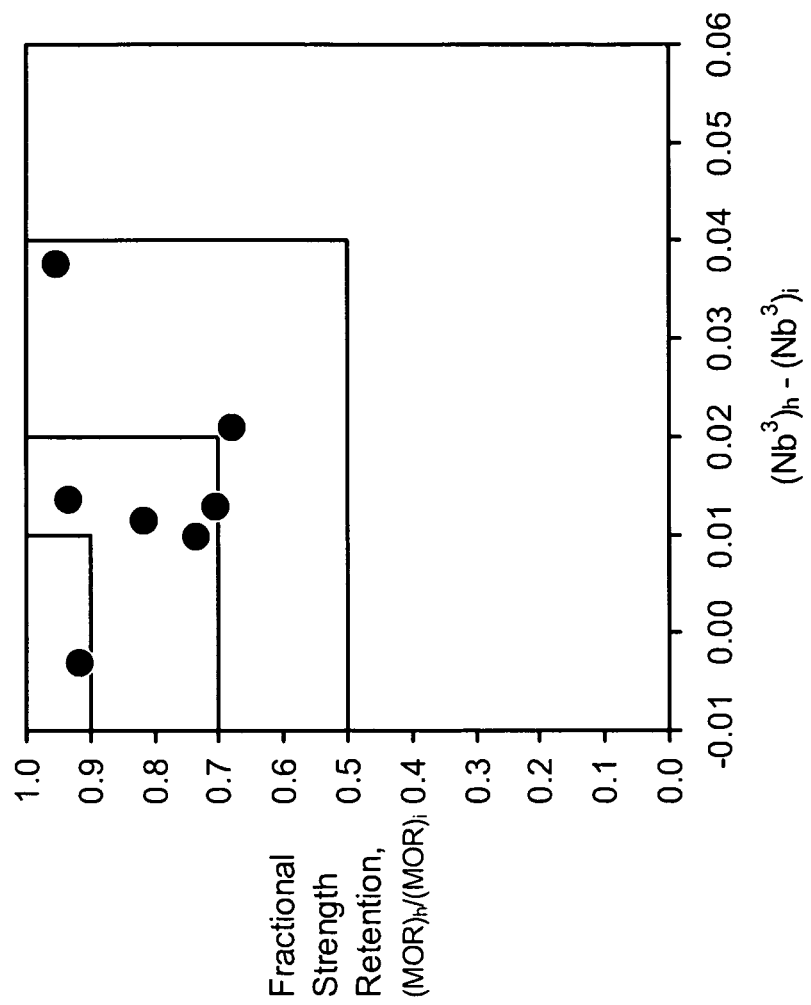
FIG. 11 plots the ratio of the modulus of rupture after holding for 100 hours at 1050° C. to the initial modulus of rupture prior to heat treatment, $(MOR)_h/(MOR)_i$, versus the difference between the microcrack index, $Nb^3$, after holding for 100 hours at 1050° C. and the initial microcrack index, $(Nb^3)_h-(Nb^3)_i$ for inventive examples.

It has further been found that the decrease in strength is proportional to the increase in $E_{900° C.}/E_{25° C.}$ or the increase in $Nb^3$. As shown in FIG. 10, it is preferred that the value of $E_{900° C.}/E_{25° C.}$ after exposure to 1050° C. for 100 hours minus the value of $E_{900° C.}/E_{25° C.}$ before heat treatment, $(E_{900° C.}/E_{25° C.})_h - (E_{900° C.}/E_{25° C.})_i$, may be not more than 0.06, 0.04, or even 0.02. Additionally, as shown in FIG. 11, the value of $Nb^3$ after exposure to 1050° C. for 100 hours minus the value of $Nb^3$ before heat treatment, $(Nb^3)_h - (Nb^3)_i$, may be not more than 0.04, 0.02, or even 0.01.

Similarly, in embodiments, the degree of microcracking as again characterized by the ratio $E_{900° C.}/E_{25° C.}$ or as characterized by the microcrack parameter $Nb^3$ remains stable after exposure to relatively harsh acidic conditions. Such harsh acidic conditions can be simulated by immersing the honeycomb body in nitric acid having a pH value of about 3.0 for about one hour at room temperature, followed by drying and calcining at 550° C. for 4 hours. To that end, after the acidic treatment set forth above, embodiments may still exhibit an $E_{900°\,C.}/E_{25°\,C.} \leq 0.99$, $E_{900°\,C.}/E_{25°\,C.} \leq 0.98$, $E_{900°\,C.}/E_{25°\,C.} \leq 0.97$, $E_{900°\,C.}/E_{25°\,C.} \leq 0.96$, $E_{900°\,C.}/E_{25°\,C.} \leq 0.95$, $E_{900°\,C.}/E_{25°\,C.} \leq 0.94$, or even $E_{900°\,C.}/E_{25°\,C.} \leq 0.93$. Additionally or alternatively, after the acidic treatment embodiments of the disclosure may also exhibit a microcrack parameter $Nb^3 \leq 0.07$, $Nb^3 \leq 0.06$, $Nb^3 \leq 0.05$, $Nb^3 \leq 0.04$, $Nb^3 \leq 0.03$, $Nb^3 \leq 0.02$, or even $Nb^3 \leq 0.01$.

In a preferred embodiment, the porous ceramic honeycomb body comprises a primary cordierite ceramic phase, a porosity of at least 50% and a thermal shock parameter $(MOR_{25°\,C.}/E_{25°\,C.})(CTE_{500\text{-}900°\,C.})^{-1}$ of at least 550° C. and more preferably at least 650° C. Further, after exposure to a temperature of 1050° C. for 100 hours the ceramic honeycomb body may exhibit at least one of: 1) a microcrack parameter $Nb^3$ of not more than 0.03, or 2) an elastic modulus ratio $E_{900°\,C.}/E_{25°\,C.}$ during heating of not more than 0.96. Still further, the honeycomb body may have a value of $\Delta I \geq 0.10$.

According to further embodiments, after exposure to a temperature of 1050° C. for 100 hours the honeycomb body may exhibit at least one of an elastic modulus ratio $E_{ratio} \leq 0.96$, and a microcrack parameter $Nb^3 \leq 0.03$; or even at least one of an elastic modulus ratio $E_{ratio} \leq 0.94$, and a microcrack parameter $Nb^3 \leq 0.015$.

Moreover, after exposure to a temperature of 1050° C. for 100 hours the honeycomb body may exhibit at least one of a change in elastic modulus ratio $E_{ratio}$, after heating, $[(E_{ratio})_h - (E_{ratio})_i] \leq 0.06$, a change in microcrack parameter $Nb^3$ after heating, $[(Nb^3)_h - (Nb^3)_i] \leq 0.04$, and a fractional retained strength, $[(MOR)_h/(MOR)_i] \geq 0.50$, where "h" indicates the property after 100 hours at 1050° C., and "i" indicates the initial value before heat treatment. In other embodiments, after exposure to a temperature of 1050° C. for 100 hours the honeycomb body may exhibit at least one of a change in elastic modulus ratio $E_{ratio}$, after heating, $[(E_{ratio})_h - (E_{ratio})_i] \leq 0.04$, a change in microcrack parameter $Nb^3$ after heating, $[(Nb^3)_h - (Nb^3)_i] \leq 0.02$, or a fractional retained strength, $[(MOR)_h/(MOR)_i] \geq 0.70$; or even a change in elastic modulus ratio $E_{ratio}$, after heating, $[(E_{ratio})_h - (E_{ratio})_i] \leq 0.02$, a change in microcrack parameter $Nb^3$ after heating, $[(Nb^3)_h - (Nb^3)_i] \leq 0.01$, or a fractional retained strength, $[(MOR)_h/(MOR)_i] \geq 0.90$.

Figure 13:
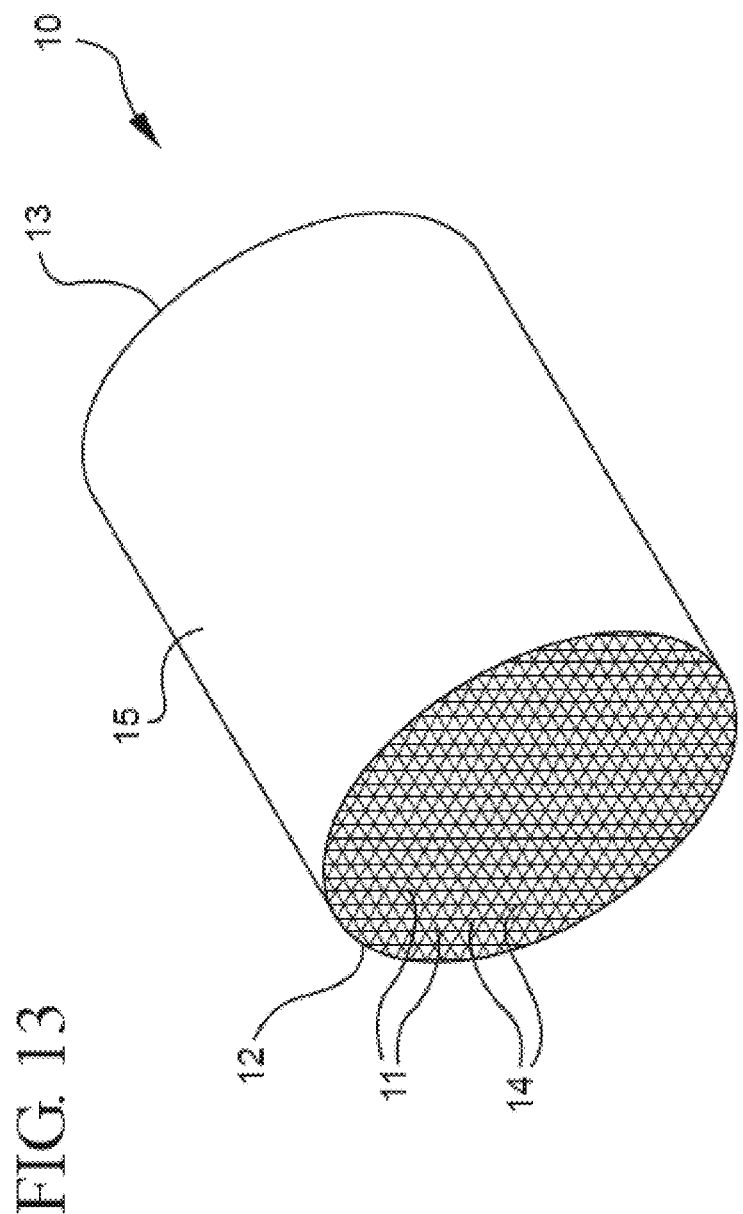
FIG. 13 is an isometric view of porous honeycomb substrate.

The porous cordierite ceramic honeycomb bodies comprise a plurality of cell channels extending between a first and second end as shown for example in FIGS. 13 and 44. The ceramic honeycomb body may have a honeycomb structure that may be suitable for use as, for example, flow-through catalyst substrates or wall-flow exhaust gas particulate filters, such as diesel particulate filters and gasoline engine particulate filters. A typical porous ceramic honeycomb flow-through substrate article 10 according to embodiments of the disclosure is shown in FIG. 13 and includes a plurality of generally parallel cell channels 11 formed by and at least partially defined by intersecting cell walls 14 (otherwise referred to as "webs") that extend from a first end 12 to a second end 13. The channels 11 are unplugged and flow through them is straight down the channel from first end 12 to second end 13. Preferably, the honeycomb article 10 also includes an extruded smooth skin 15 formed about the honeycomb structure, although this is optional and may be formed in later processing as an after applied skin. In embodiments, the wall thickness of each cell wall 14 for the substrate can be, for example, between about 0.002 to about 0.010 inches (about 51 to about 254 µm). The cell density can be, for example from about 300 to about 900 cells per square inch (cpsi). In a preferred implementation, the cellular honeycomb structure can consist of multiplicity of parallel cell channels 11 of generally square cross section formed into a honeycomb structure. Alternatively, other cross-sectional configurations may be used in the honeycomb structure as well, including rectangular, round, oblong, triangular, octagonal, hexagonal, or combinations thereof. "Honeycomb" refers to a connected structure of longitudinally-extending cells formed of cell walls, having a generally repeating pattern therein.

FIG. 14 illustrates an exemplary honeycomb wall flow filter 100 according to embodiments of the disclosure. The general structure includes a body 101 made of intersecting porous ceramic walls 106 extending from the first end 102 to the second end 104. Certain cells are designated as inlet cells 108 and certain other cells are designated as outlet cells 110. In the filter 100, certain selected channels include plugs 112. Generally, the plugs are arranged at the ends of the channels and in some defined pattern, such as the checkerboard patterns shown. The inlet channels 108 may be plugged at the outlet end 104 and the outlet channels 110 may be plugged at the inlet end 102. Other plugging patterns may be employed and all of the outermost peripheral cells may be plugged (as shown) for additional strength. Alternately, some of the cells may be plugged other than at the ends. In embodiments, some channels can be flow-through channels and some can be plugged providing a so-called partial filtration design. In embodiments, the wall thickness of each cell wall 14 for the filter can be for example from about 0.003 to about 0.030 inches (about 76 to about 762 µm). The cell density can be for example between about 100 and 400 cells per square inch (cpsi).

References to cordierite ceramic bodies or honeycombs refer to cordierite composition comprised predominately of $Mg_2Al_4Si_5O_{18}$. However, the cordierite bodies can also contain compositions having other molecules or elements in the channel site or other lattice sites of the cordierite crystal lattice.

In embodiments, the disclosure also provides a method for making the porous cordierite ceramic honeycomb structures described above, where a plasticized ceramic forming precursor batch composition is provided by compounding an inorganic powder batch mixture together with an organic binder; and a liquid vehicle. The plasticized batch can further comprise one or more optional constituents including pore-forming agents, plasticizers, and lubricants. The plasticized batch is then formed by shaping, such as by extrusion, into a green honeycomb. These green honeycombs are then dried, such as by microwave, RF, or air drying, and fired in a kiln for a time and at a temperature sufficient to sinter or reaction sinter the inorganic raw material sources into unitary cordierite ceramic honeycomb bodies. The sintered ceramic honeycomb bodies exhibit relatively low microcracking and relatively high thermal shock resistance as described above.

The inorganic powder batch can comprise a mixture of raw cordierite forming components that can be heated under conditions effective to provide a primary sintered phase cordierite composition. The raw cordierite forming batch components can include, for example, a magnesium source; an aluminum source; and a silicon source. As an example the inorganic ceramic powder batch composition can be selected to provide a cordierite composition consisting essentially of from about 49 to about 53 percent by weight $SiO_2$, from about 33 to about 38 percent by weight $Al_2O_3$, and from about 12 to about 16 percent by weight MgO. The median particle diameter ($D_{50}$) of each cordierite forming raw material is preferably less than 30 µm, and more preferably less than 25 µm. The $D_{90}$ particle diameter of each cordierite-forming raw material is preferably less than 50 µm, and more preferably less than 40 µm. The $D_{90}$ particle diameter is the diameter at which 90% of the particles by volume are of a finer particle diameter. Similarly, the $D_{10}$ particle diameter is the diameter at which 10% of the particles by volume are of a finer particle diameter.

A "magnesium source" is any compound that contains magnesium, such as, for example, talc, chlorite, forsterite, enstatite, actinolite, serpentine, spinel, sapphirine, or a magnesium oxide forming source, etc. and their calcined products. A magnesium oxide forming source is any magnesium source which, upon heating, converts to magnesium oxide, MgO, such as, for example, magnesium oxide, magnesium hydroxide, magnesium carbonate, and the like.

When the magnesium source comprises talc, it is preferred that the talc have a platy particle morphology, such that the talc has an XRD talc morphology index of between 0.6 and 1.0. Talc having a very platy morphology will have a high morphology index. The talc morphology index is more preferably at least 0.85, because talc with a platy particle shape promotes the growth of cordierite crystals with their negative-expansion z-axes in the plane of the wall, thereby lowering CTE in the axial and radial directions of the honeycomb article. The value of the XRD talc morphology index can range from 0.0 to 1.0 and is proportional to the aspect ratio, or platy character, of the talc particles. The talc morphology index is measured by x-ray diffractometry on a talc powder that is packed into the x-ray diffraction sample holder to maximize the orientation of the talc within the plane of the sample holder, as described in U.S. Pat. No. 5,258,150. The XRD talc morphology index, M, is defined by the relationship:

$$M=I(004)/[I(004)+I(020)] \quad \text{EQ. 16}$$

where I(004) and I(020) are the x-ray intensities of the (004) and (020) reflections as measured by Cu Kα radiation. When the talc is provided as a calcined talc, the morphology index shall refer to that of the talc powder prior to being calcined.

According to embodiments, it is preferred that the weighted average median particle diameter of the talc and calcined talc sources is less than about 25 µm, less than about 15 µm, or even less than about 10 µm. Particle diameter of all raw materials is measured by a laser diffraction technique, such as by a Microtrac® particle size analyzer.

An "aluminum" source is any compound that contains aluminum, such as an alumina forming source, kaolin, pyrophyllite, kyanite, mullite, sillimanite, andalusite, magnesium aluminate spinel, sapphirine, chlorite, etc. and their calcined products. An alumina forming source is a compound that converts to aluminum oxide, $Al_2O_3$, upon heating, such as corundum; a transitional alumina such as gamma, theta, chi, and rho alumina; aluminum hydroxide, also known as aluminum trihydrate or Gibbsite; or an aluminum oxide hydroxide such as boehmite or diaspore; etc. An alumina forming source, if present, preferably has a median particle diameter of less than 15 µm, and more preferably less than 10 µm. In still further embodiments, the median particle size of the alumina forming source is preferably less than 8 µm, including for example, median particle sizes less than 7 µm, less than 6 µm, less than 5, less than 4, less than 3, less than 2, or even less than 1 µm. However, except where an alumina forming source having a fine particle diameter, such as less than about 1 micron, is required to achieve a fine pore size in the fired ceramic or to provide strength to the body after removal of the organic binder, it is otherwise preferred that the alumina forming source have a median particle size of at least 3 microns, or even at least 5 microns, because a low degree of microcracking is more easily achieved with such coarser alumina forming sources.

If desired, the aluminum source can include a dispersible alumina forming source. A dispersible alumina forming source can be an alumina forming source that is at least substantially dispersible in a solvent or liquid medium during mixing and forming, and that can be used to provide a colloidal suspension in a solvent or liquid medium. In embodiments, a dispersible alumina forming source can be a relatively high surface area alumina forming source having a specific surface area of at least 20 $m^2$/g. Alternatively, a dispersible alumina forming source can have a specific surface area of at least 50 $m^2$/g. In an exemplary embodiment, a suitable dispersible alumina forming source for use in the methods of the disclosure includes alpha aluminum oxide hydroxide (AlOOH.x$H_2$O) commonly referred to as boehmite, pseudoboehmite, and as aluminum monohydrate. In exemplary embodiments, the dispersible alumina forming source can include the so-called transition or activated aluminas (i.e., aluminum oxyhydroxide and chi, eta, rho, iota, kappa, gamma, delta, and theta alumina) which can contain various amounts of chemically bound water or hydroxyl functionalities. It is preferred that the amount of highly dispersible, high surface area alumina forming source is not more than 10 weight percent of the inorganic batch mixture, and more preferably not more than 8 wt. % or even 6 wt. %.

A "silicon source" is any compound that contains silicon, including, for example, kaolin, mullite, kyanite, sillimanite, andalusite, pyrophyllite, talc, chlorite, sapphirine, forsterite, enstatite, sapphirine, zeolite, diatomaceous silica, or a silica forming source, and their calcined products. In embodiments, the silicon source can preferably have a median particle diameter less than 15 microns, or even more preferably less than 10 microns. Exemplary kaolin clays include, for example, non-delaminated kaolin raw clay, having a particle diameter of about 2-11 microns, such as about 6-11 microns or about 2-5 microns.

A silica forming source is any compound that forms silica, $SiO_2$, upon heating. For example, a silica forming source can be quartz, cristobalite, tridymite, tripoli silica, flint, fused silica, colloidal or other amorphous silica, etc. In some embodiments, the silica forming source is crystalline silica such as zeolite, quartz or cristobalite. In alternative embodiments, the silica forming source is non-crystalline silica such as fused silica or sol-gel silica, silicone resin, diatomaceous silica, and like materials. In still further embodiments, the silica forming source can include a compound that forms free silica when heated, such as for example, silicic acid or a silicon organo-metallic compound.

According to some embodiments of the disclosure, the cordierite forming inorganic powder batch mixture comprises at least one aluminum silicate source selected from the group consisting of mullite, kyanite, calcined kyanite, sillimanite, calcined sillimanite, andalusite, or calcined andalusite, or combinations thereof. The inorganic powder batch mixture further comprises at least one magnesium source and, optionally, one or more additional silicon and/or aluminum sources. The aluminum silicate source may be, for example, either a naturally occurring mineral source or may be a manufactured material such as by fusion, or chemical precipitation from a solution. The median particle diameter of the aluminum silicate is preferably less than 25 µm, and is more preferably less than 20 µm, less than 15 µm, and even less than 10 µm. The median particle size of the aluminum silicate is also preferably at least 1 µm, 3 µm, and even at least 5 µm. The amount of aluminum silicate source is also preferably at least 5%, at least 10%, at least 20%, and even at least 30% of the total weight of inorganic powder batch mixture. The magnesium source preferably comprises talc, calcined talc, chlorite, or a magnesium oxide forming source. The optional silicon source is preferably a silica forming source, kaolin, or calcined kaolin.

In alternative embodiments of the disclosure, the cordierite forming inorganic powder batch mixture comprises a kaolin, either raw or calcined, and at least one magnesium source selected from a magnesium aluminate spinel and a magnesium oxide forming source. When the magnesium source is a magnesium aluminate spinel, the median particle size of the magnesium aluminate spinel is preferably less than 20 μm, and more preferably less than 15 μm, and even less than 10 μm, but is preferably greater than 1 μm and more preferably greater than 3 μm. The amount of magnesium aluminate spinel is preferably at least 5%, and more preferably at least 10%, 20% or even 30% of the cordierite forming inorganic powder batch mixture. When the magnesium source is a magnesium oxide forming source, the median particle size of the magnesium oxide forming source is preferably less than 10 μm, and more preferably less than 5 μm, 3 μm, or even less than 1 μm. The amount of magnesium oxide forming source is preferably at least 5%, at least 8%, 10%, 12%, or even at least 14% of the cordierite forming inorganic powder batch mixture. The cordierite forming inorganic powder batch mixture also contains an additional source of silicon, which is preferably selected from talc, chlorite, or a silica forming source and their calcined products. Still further, the cordierite forming inorganic powder batch mixture can optionally contain other alumina sources such as, for example, an alumina forming source. According to these embodiments, the amount of raw (uncalcined) kaolin is preferably less than 20% in order to avoid macro-cracking (fractures longer than about 1 mm) during firing of the ware.

In some embodiments, the cordierite forming inorganic powder batch mixture comprises a talc having a median particle diameter of between 3 and 30 microns, and in some of these embodiments between 3 and 25 microns, and having an XRD talc morphology index greater than 0.80; at least 10% of a magnesium aluminate spinel having a median particle diameter between 3 and 15 microns; 5 to 20% of a kaolin, and in some of these embodiments the kaolin has a median particle diameter of at least 5 microns; an alumina forming source having a median particle diameter of between 3 and 12 microns, and in some of these embodiments between 3 and 10 microns; and a silica forming source having a median particle diameter of between 4 and 20 microns, and in some of these embodiments between 4 and 10 microns.

In other embodiments, the cordierite forming inorganic powder batch mixture comprises a talc having a median particle diameter of between 3 and 30 microns, and in some of these embodiments between 3 and 25 microns, and having an XRD talc morphology index greater than 0.80; at least 10% of an aluminum silicate source having a median particle diameter between 4 and 15 microns, the aluminum silicate source being selected from the group consisting of mullite, kyanite, calcined kyanite, sillimanite, calcined sillimanite, andalusite, or calcined andalusite, or combinations thereof; an alumina forming source having a median particle diameter of between 3 and 12 microns, and in some of these embodiments between 3 and 10 microns; and a silica forming source having a median particle diameter of between 4 and 20 microns, and in some of these embodiments between 4 and 10 microns.

In still other embodiments, the cordierite forming inorganic powder batch mixture comprises a talc having a median particle diameter of between 3 and 30 microns, and in some of these embodiments between 3 and 25 microns, and having an XRD talc morphology index greater than 0.80; at least 5% of a magnesium oxide forming source having a median particle diameter of less than 10 microns, and in some of these embodiments less than 3 microns; 5 to 20% of a kaolin, wherein in some embodiments the kaolin has a median particle diameter of at least 5 microns; an alumina forming source having a median particle diameter of between 0.5 and 12 microns, and in some of these embodiments between 0.5 and 10 microns; and a silica forming source having a median particle diameter of between 4 and 20 microns, and in some of these embodiments between 4 and 10 microns.

The plasticized batch composition may optionally contain a source of metal oxides other than MgO, $Al_2O_3$, and $SiO_2$, which partition into a liquid phase during sintering and which contribute to the presence of a glass phase after cooling. As noted previously, the presence of a glass phase has been found to further reduce the microcrack index of the cordierite ceramic honeycomb body and also may provide a narrower pore size distribution. It is preferred that the glass-forming metal oxide source has a median particle size of not more than 10 microns, and is preferably finer than 5 microns or even finer than 2 microns. When the glass forming metal oxide is a rare earth oxide, it is preferably added as an yttrium oxide or lanthanum oxide containing source, preferably so as to provide 0.5 to 2.0% yttrium oxide or 1.0 to 3.0% lanthanum oxide in the fired body. The volume of the glass phase as a percentage of the total solid ceramic matrix (excluding porosity) is preferably at least 3%, and more preferably at least 4%, or even at least 5% or even 6%, and is preferably not more than 10%.

The ratio of magnesia, alumina, and silica components in the bulk raw material mixture can be chosen to form only stoichiometric cordierite, or may be selected to allow the formation of some spinel, sapphirine, mullite, forsterite, enstatite, or a glass phase.

According to preferred embodiments, the plasticized batch composition can comprise at least 10 wt % pore forming agent, and preferably at least 20%, at least 40%, or even at least 50% pore-forming agent. The weight percent of the pore forming agent is calculated as a super-addition to the oxide-forming raw materials. Thus, for example, the addition of 50 parts by weight of a pore forming agent to 100 parts by weight of oxide forming raw materials shall constitute 50% addition of pore forming agent. The pore-forming agents can include, for example, graphite, starch, nut shells, synthetic organic particles, or even combinations thereof. The starch can include, for example, sago palm starch, green mung bean starch, canna starch, corn starch, rice starch, or potato starch. The median particle diameter of the pore forming agent is selected according to the application of the ceramic honeycomb, and is preferably between 1 and 60 microns, and is more preferably between 5 and 40 microns. In some embodiments of the disclosure, the combination of pore formers preferably has a weighted average median particle diameter less than about 25 microns, less than about 15 microns, or even less than about 10 microns.

To provide the plasticized batch compositions of the disclosure, the inorganic powder batch composition, including the aforementioned powdered ceramic materials, the glass forming metal oxide source, and any pore former, can be compounded with a liquid vehicle, an organic binder, and one or more optional forming or processing aids. Exemplary processing aids or additives can include lubricants, surfactants, plasticizers, and sintering aids. Exemplary lubricants can include hydrocarbon oil, tall oil, or sodium stearate.

The organic binder component can include water soluble cellulose ether binders such as methylcellulose, hydroxypropyl methylcellulose, methylcellulose derivatives, or a combination thereof. Particularly preferred examples include methylcellulose and hydroxypropyl methylcellulose. Preferably, the organic binder can be present in the composition as a super addition in an amount in the range of from 0.1 weight percent to 8 weight percent of the inorganic powder batch composition, and more preferably, in an amount of from about 3 weight percent to about 6 weight percent of the inorganic powder batch composition. The incorporation of the organic binder into the batch composition can further contribute to the cohesion and plasticity of the composition. The improved cohesion and plasticity can, for example, improve the ability to shape the mixture into a honeycomb body.

A preferred liquid vehicle for providing a flowable or paste-like consistency to the inventive compositions is water, although other liquid vehicles exhibiting solvent action with respect to suitable temporary organic binders can be used. The amount of the liquid vehicle component can vary in order to impart optimum handling properties and compatibility with the other components in the ceramic batch mixture. Preferably, the liquid vehicle content is present as a super addition in an amount in the range of from 15% to 70% by weight of the inorganic powder batch composition, and usually in the range of from 20% to 40% by weight of the inorganic powder batch composition. Minimization of liquid components in the disclosed compositions can lead to further reductions in undesired drying shrinkage and crack formation during the drying process.

The honeycomb substrate such as that depicted in FIG. 13 can be formed from the plasticized batch according to any conventional process suitable for forming honeycomb bodies. For example, in embodiments a plasticized batch composition can be shaped into a green body by any known conventional ceramic forming process, such as, e.g., extrusion, injection molding, slip casting, centrifugal casting, pressure casting, dry pressing, and the like. In embodiments, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The resulting honeycomb body can then be dried, and subsequently fired under conditions effective to convert the formed green composition into a primary sintered phase ceramic composition. Conditions effective for drying the formed green body functionally can include those conditions capable of removing at least substantially all of the liquid vehicle present within the green composition. As used herein, at least substantially all include the removal of at least about 95%, at least about 98%, at least about 99%, or even at least about 99.9% of the liquid vehicle present prior to drying. Exemplary and non-limiting drying conditions suitable for removing the liquid vehicle include heating the green honeycomb substrate at a temperature of at least about 50° C., at least about 60° C., at least about 70° C., at least about 80° C., at least about 90° C., at least about 100° C., at least about 110° C., at least about 120° C., at least about 130° C., at least about 140° C., or even at least about 150° C. for a period of time sufficient to at least substantially remove the liquid vehicle from the green composition. In embodiments, the conditions effective to at least substantially remove the liquid vehicle comprise heating the formed green body at a temperature of at least about 60° C. Further, the heating can be provided by any conventionally known method, including for example, hot air drying, RF, microwave drying, or a combination thereof.

With reference again to FIG. 14, either before or after the green body has been fired, a portion of the cells 110 of a formed monolithic honeycomb 100 can be plugged at the inlet end 102 with a paste having the same or similar composition to that of the body 101. The plugging is preferably performed only at the ends of the cells and form plugs 112 having a depth of about 5 to 20 mm, although this can vary. A portion of the cells on the outlet end 104 but not corresponding to those on the inlet end 102 may also be plugged in a similar pattern. Therefore, each cell is preferably plugged only at one end. The preferred arrangement is to therefore have every other cell on a given face plugged as in a checkered pattern as shown in FIG. 14. Further, the inlet and outlet channels can be any desired shape. However, in the exemplified embodiment shown in FIG. 14, the cell channels are square in cross-sectional shape.

The formed honeycomb bodies can then be fired under conditions effective to convert the inorganic powder batch composition into a primary sintered phase cordierite composition. Exemplary firing conditions can comprise heating the honeycomb green body at a maximum firing temperature in the range of from about 1360 to 1440° C. for 4 to 40 hours to form a body with at least 80% cordierite. The total time from room temperature till the end of the hold at maximum temperature is preferably at least 25 hours. The mean heating rate between 800 and 1300° C. may be not more than 75° C./h, 50° C./h, and even 20° C./h. When the inorganic mixture comprises a kaolin or calcined kaolin and a magnesium oxide forming source, the heating rate from 700 to 1000° C. may be not more than 50° C./h, 30° C./h, and even not more than 20° C./h.

Examples

To further illustrate the principles of the disclosure, the following examples provide those of ordinary skill in the art with a complete disclosure and description of how the cordierite honeycomb bodies and methods claimed herein are made and evaluated. Efforts have been made to ensure accuracy with respect to numbers (e.g., amounts, temperatures, etc.); however, some errors and deviations may have occurred. Unless indicated otherwise, parts are parts by weight, temperature is ° C. or is at ambient temperature, and pressure is at or near atmospheric.

Table 1 lists the median particle diameters ($D_{50}$) of the raw materials used to make the examples, as well as their values of $D_{10}$ and $D_{90}$. Also included are the typical weight percentages of $MgO$, $Al_2O_3$, $SiO_2$, $FeO_2$, $TiO_2$, $Na_2O$, $K_2O$ and $CaO$ of the cordierite forming raw materials. "LOI" is the approximate loss of ignition (% weight loss) when the raw material is heated to about 1000° C. Tables 2 to 8 list the raw material combinations of the comparative and inventive examples. Tables 9 to 15 list the firing conditions and physical properties of the comparative and inventive examples.

In preparing the examples, inorganic raw materials and pore formers were mixed with 6% methylcellulose binder and 1% of a sodium stearate lubricant, or 6% methyl cellulose binder, 4.6% Durasyn 162, and 0.6% tall oil, and water was added to the powder mixture in a stainless steel muller or plough mixer to form a plasticized batch. Batches weighing about 1500 grams (about 3.3 pounds) were extruded on a ram-type extruder into 1-inch diameter honeycomb having approximately 200 cells/inch$^2$ and approximately 0.016-inch walls and also as 0.3-inch diameter rod. Batches weighing about 30 pounds were extruded on a twin-screw type extruder into 2-inch diameter ware having approximately 300 cells/inch$^2$ and 0.014-inch walls or approximately 600 cells/inch$^2$ and 0.003 to 0.004-inch walls, or approximately 400 cells/inch$^2$ and 0.004 to 0.010-inch walls. One of the comparative examples was prepared as a 100-pound batch and extruded as 5.66-inch diameter ware on a ram extruder with a cell geometry of about 275 cells/inch$^2$ and 0.008-inch walls. One-inch diameter ware was cut into 8-inch lengths, wrapped in aluminum foil, and dried in a convection oven at about 90° C. Rod was cut into 30-inch segments and dried in silica tubes in a similar manner. Two-inch and 5.66-inch diameter ware were also cut into 8-inch lengths, which were partially dried in a microwave heated oven and subsequently fully dried in a convection oven at about 90° C. The extruded ware was then fired in an electric kiln. Specific aspects of the firing cycle that affect the physical properties of the fired cordierite ceramic are provided in the Tables. Heating rates at temperature ranges other than those specified in the Tables were sufficient to prevent cracking of the ware. The time from room temperature to 700° C. was approximately 74 to 76 hours.

All properties were measured on fired honeycomb specimens except for the elastic modulus measurements made for the 3.3-pound extrusions, which were measured on 5-inch long rod. In the Tables, the mean coefficients of thermal expansion from 25 to 800° C., from 200 to 1000° C., and from 500 to 900° C., in units of $10^{-7}$/° C., were measured by dilatometry on a specimen parallel to the lengths of the channels of the honeycomb article ("axial direction"). The % porosity is the volume percentage of porosity in the walls of the article as measured by mercury porosimetry. Pore volume in units of ml/g was also determined by mercury porosimetry. The terms $d_{10}$, $d_{25}$, $d_{50}$, $d_{75}$, and $d_{90}$ denote the pore diameters, in microns, or micrometers ($10^{-6}$ meters), at which 10%, 25%, 50%, 75%, and 90% of the total pore volume are of a finer pore diameter, respectively, also as measured by mercury porosimetry. Thus, for example, $d_{90}$ is the pore diameter at which 90% (by volume) of the pores are of a smaller diameter (equal to the pore diameter at which the cumulative mercury intrusion volume equals 10% of the total mercury intrusion volume). It therefore follows that, for example, $d_{10} < d_{50} < d_{90}$.

The thermal shock parameter, TSP, was computed as $(MOR_{25° C.}/E_{25° C.})(CTE_{500-900° C.})^{-1}$, as defined previously. Also calculated were another thermal shock parameter, $TSP^* = (MOR_{25° C.}/E_{25° C.})(CTE_{200-1000° C.})^{-1}$, and the corresponding thermal shock limit, $TSL^* = TSP^* + 200°$ C. The value of TSL* provides an estimate of the maximum temperature that the ceramic honeycomb article can withstand when the coolest region elsewhere in the part is at about 200° C.

Weight percentages of residual mullite, spinel+sapphirine, and alpha-alumina in the fired samples were measured by x-ray diffractometry. The amount of spinel and sapphirine are included together due to the potential difficulty in distinguishing between the two phases, depending upon the XRD technique used.

The axial XRD I-ratio and transverse XRD I-ratio are defined by EQ. 1 and were measured by x-ray diffractometry using copper K$\alpha$ radiation. For randomly oriented cordierite crystals, the axial and transverse I-ratios are both equal to approximately 0.655. Values of the transverse I-ratio greater than 0.655 and values of the axial I-ratio lower than 0.655 indicate that the cordierite crystals are preferentially oriented with their z-axes parallel to the plane of the wall. (The presence of large amounts of spinel tends to lower the cordierite I-ratio due to an overlap of a spinel XRD peak with the cordierite (002) reflection.)

All modulus of rupture (MOR), or flexural strength, values were measured by the four-point method on a cellular bar (approx. 0.5 inch×0.25 inch×2.75 inches long) parallel to the axial direction of the honeycomb. Elastic modulus values were measured by a sonic resonance technique either on a cellular bar (1 inch×0.5 inch×5 inches long) parallel to the axial direction, or on a non-cellular rod in the case of the 3.3-pound extrusions. Cell geometries are listed as "N/w" where "N" is the cell density as number of cells per square inch, and "w" is the channel wall thickness in units of $10^{-3}$ inches. CFA is the estimated closed frontal area of the honeycomb as defined previously.

For some examples, as-fired rod or honeycomb specimens were heated at 100° C./hr in air to a temperature of 1050° C., held at 1050° C. for 100 hours, and cooled to room temperature. Also, as-fired rod or honeycomb specimens for some examples were immersed in nitric acid having a pH of about 3.0 at room temperature for one hour, the excess liquid blown out, and the specimen dried and then calcined at 550° C. for 4 hours. The elastic modulus from room temperature to 1200° C. and back to room temperature was subsequently measured on these treated samples. Modulus of rupture and CTE were also measured on selected compositions after exposure to 1050° C. for 100 hours.

The comparative examples in Table 9 demonstrate cordierite bodies prepared according to the prior art that either do not exhibit low microcracking in the as-fired ware, or which may display low microcracking in the as-fired ware but do not maintain low microcracking after exposure to 1050° C. for 100 hours in air. Examples 9.1 to 9.4 illustrate typical porous cordierite bodies prepared according to conventional methods using talc+alumina+quartz±kaolin in which the ceramics have a high degree of microcracking, as indicted by a ratio of $E_{900° C.}/E_{25° C.}$ that is substantially greater than 1.00 and a microcrack parameter greater than 0.20. Comparative examples 9.5 to 9.7 exhibit high porosity, high CTE, and low microcracking in the as-fired ware as indicated by values of $E_{900° C.}/E_{25° C.} \leq 0.96$ and values of the microcrack parameter $\leq 0.05$. Examples 9.6 and 9.7 further contain glass-forming metal oxide additions. However, these comparative examples undergo an undesirable increase in microcracking after exposure to 1050° C. for 100 hours, as shown by an increase in $E_{900° C.}/E_{25° C.}$ to >0.99 and an increase in microcrack parameter $Nb^3$ to >0.07.

Figure 4:
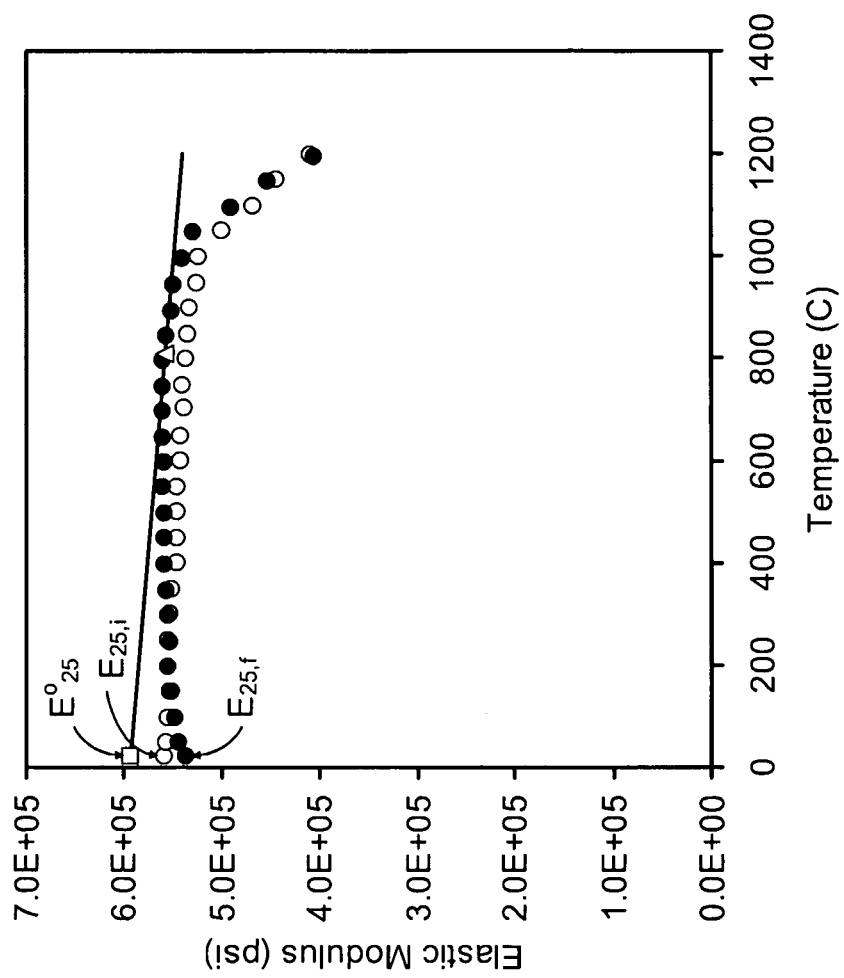
FIG. 4 depicts the elastic modulus versus temperature behavior for a comparative low-microcracked cordierite honeycomb ceramic (EX. 9.5) during heating to 1200° C. (open circles) and cooling back to room temperature (filled circles). The crossover of the heating curve by the cooling curve, such that $E_{25,f} < E_{25,i}$, indicates opening of new microcracks below about 200° C. during cooling.
Figure 5:
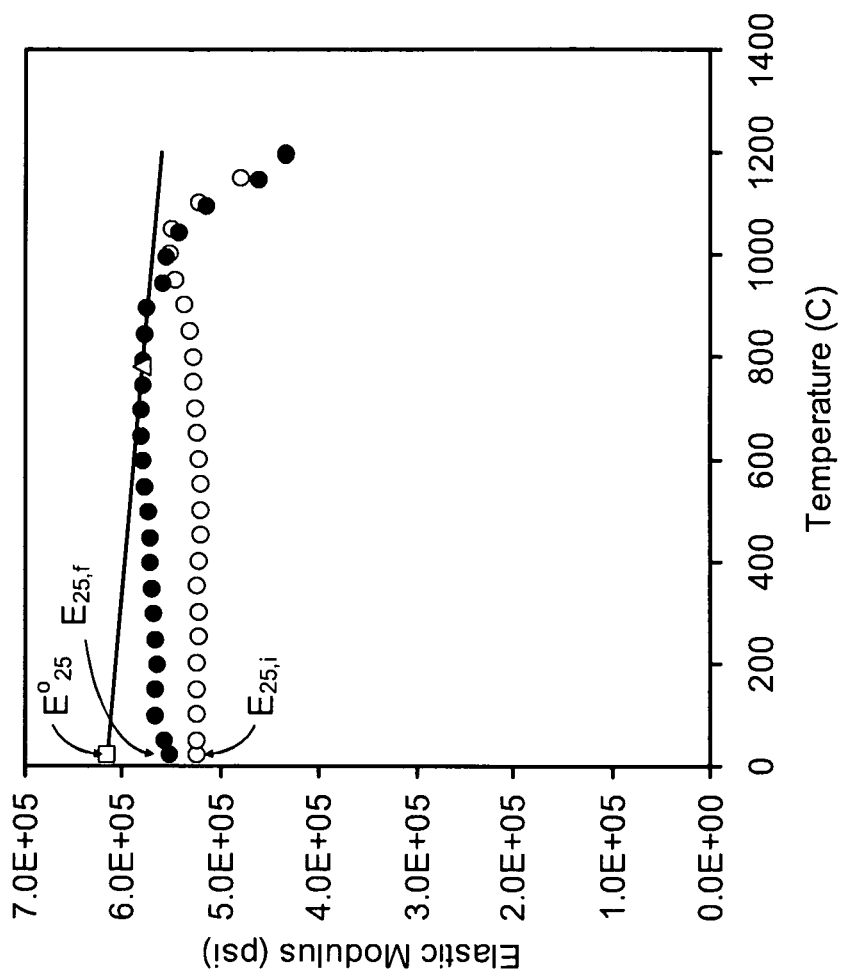
FIG. 5 depicts the elastic modulus versus temperature behavior during heating to 1200° C. (open circles) and cooling back to room temperature (filled circles) for the comparative low-microcracked cordierite honeycomb ceramic from FIG. 4 (EX. 9.5) after the sample was exposed to 1050° C. for 100 hours in air. Greater hysteresis between the heating and cooling curves relative to the as-fired sample in FIG. 4 indicates an increase in microcracking after exposure at 1050° C.

In particular, FIG. 4 depicts the elastic modulus versus temperature behavior for a comparative low-microcracked cordierite honeycomb ceramic (EX. 9.5) during heating to 1200° C. (open circles) and cooling back to room temperature (filled circles). The crossover of the heating curve by the cooling curve, such that $E_{25,f} < E_{25,i}$, indicates opening of new microcracks below about 200° C. during cooling. Likewise, FIG. 5 depicts the elastic modulus versus temperature behavior during heating to 1200° C. (open circles) and cooling back to room temperature (filled circles) for the comparative low-microcracked cordierite honeycomb ceramic from FIG. 4 (EX. 9.5) after the sample was exposed to 1050° C. for 100 hours in air. Greater hysteresis between the heating and cooling curves relative to the as-fired sample in FIG. 4 indicates an increase in microcracking after exposure at 1050° C.

Figure 6:
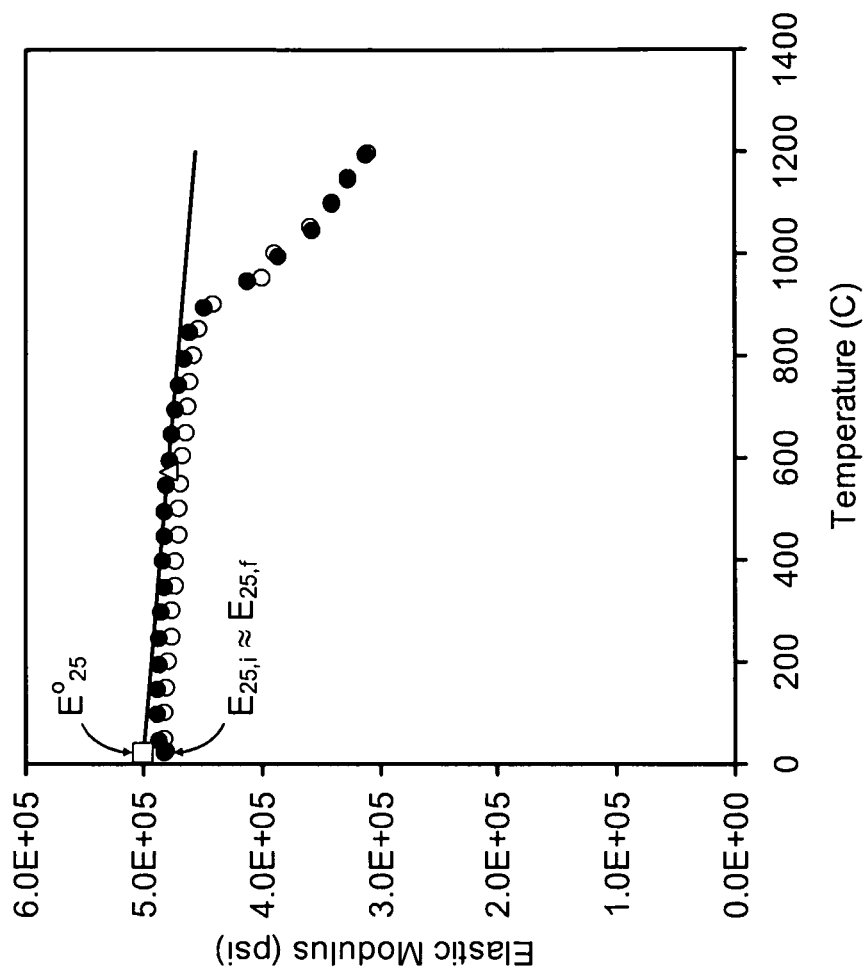
FIG. 6 depicts the elastic modulus versus temperature behavior for a comparative low-microcracked cordierite honeycomb ceramic (EX. 9.7) with glass-forming additives during heating to 1200° C. (open circles) and cooling back to room temperature (filled circles). The near overlapping of the heating and cooling trends signifies a near absence of microcracks.
Figure 7:
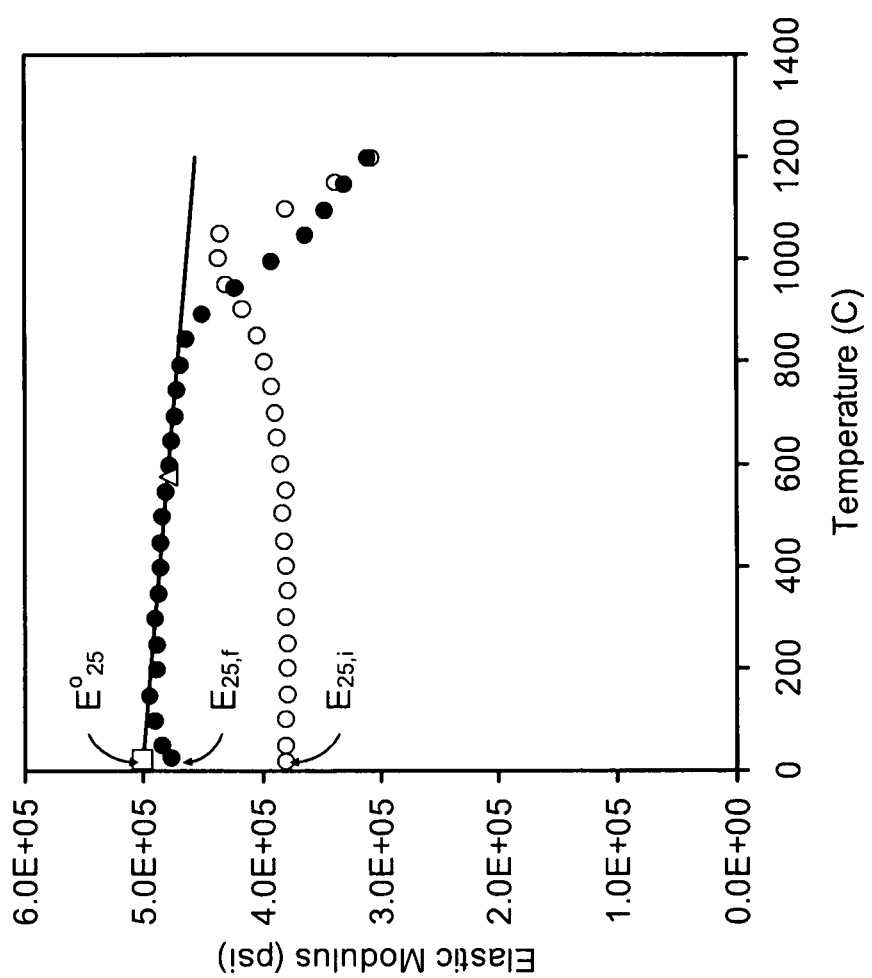
FIG. 7 depicts the elastic modulus versus temperature behavior during heating to 1200° C. (open circles) and cooling back to room temperature (filled circles) for the comparative low-microcracked cordierite honeycomb ceramic from FIG. 6 (EX. 9.7) after the sample was exposed to 1050° C. for 100 hours in air. Large hysteresis between the heating and cooling curves relative to the as-fired sample in FIG. 6 indicates an increase in microcracking after exposure at 1050° C.
Figure 8:
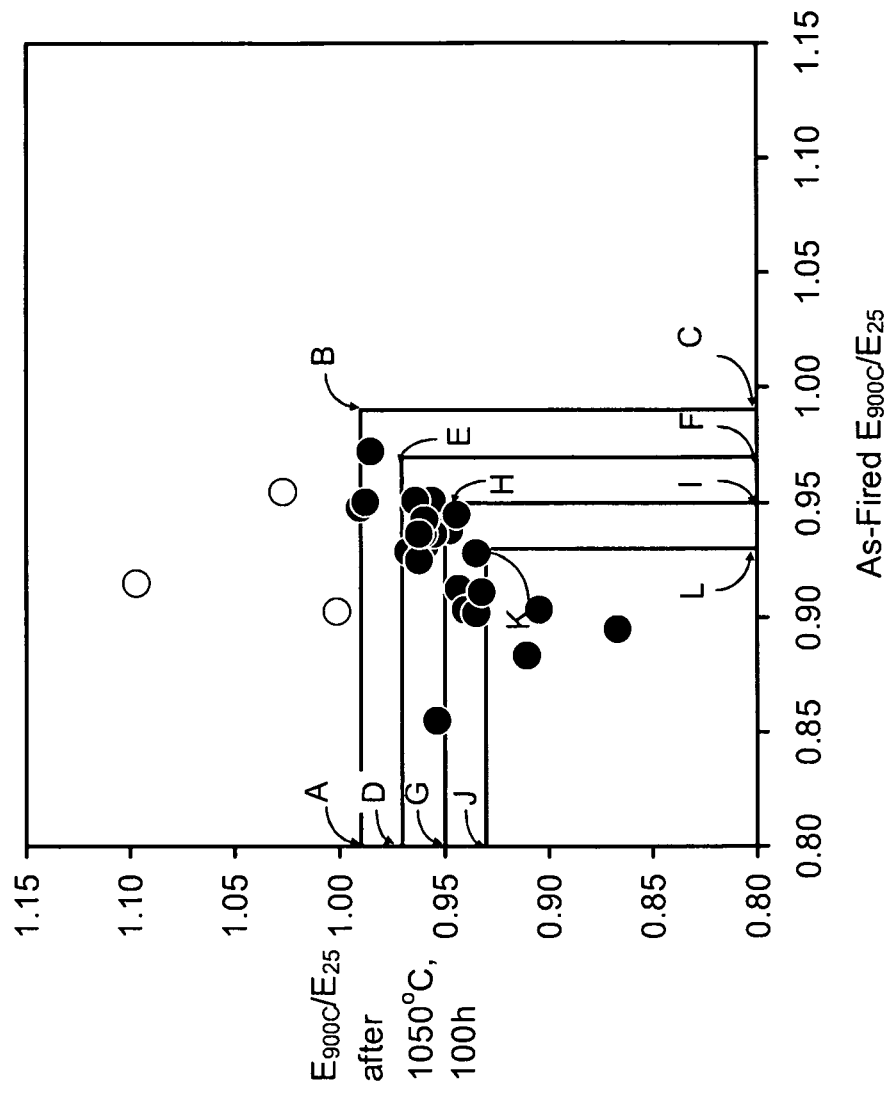
FIG. 8 shows the elastic modulus ratio $E_{900°\,C.}/E_{25°\,C.}$ during heating of inventive examples (filled circles) and comparative examples (open circles) after holding the specimen at 1050° C. for 100 hours in air versus $E_{900°\,C.}/E_{25°\,C.}$ of the as-fired samples. Preferred ranges for the microcrack index are denoted by regions A-B-C, D-E-F, G-H-I, and JKL.
Figure 9:
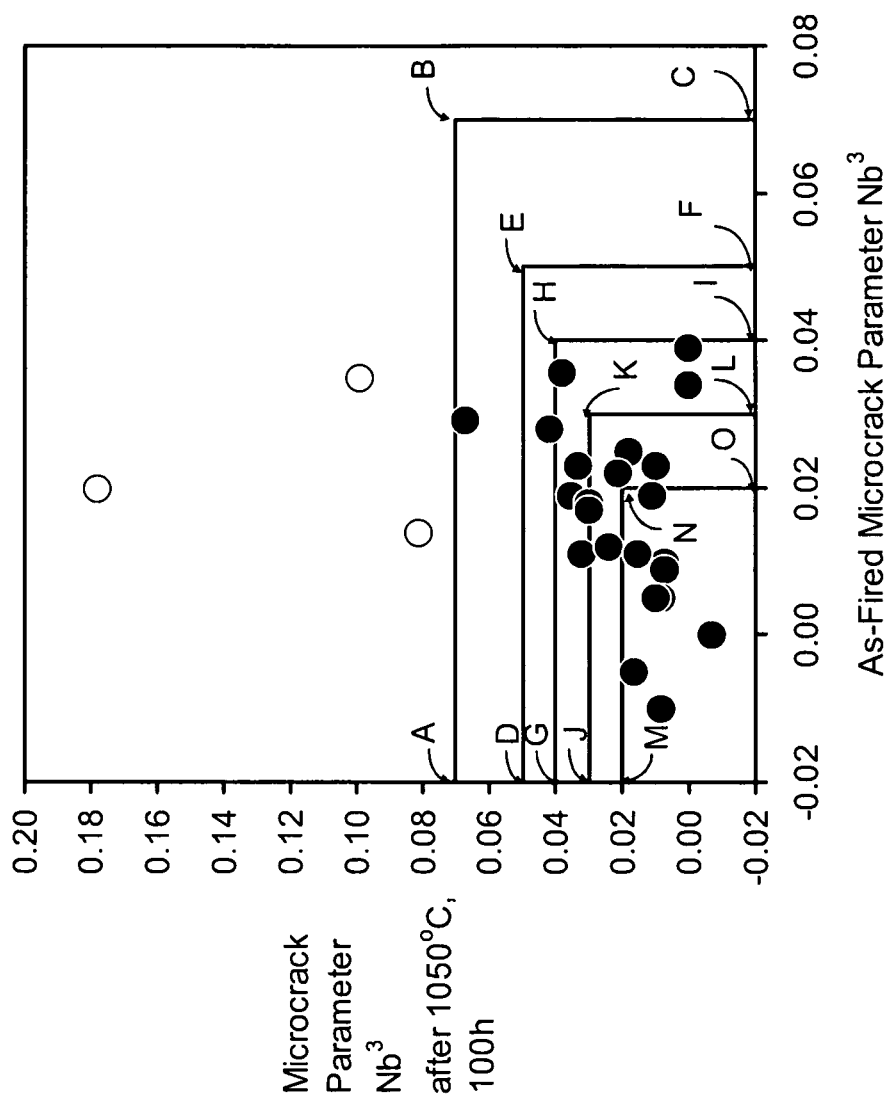
FIG. 9 plots the microcrack parameter, $Nb^3$, of inventive examples (filled circles) and comparative examples (open circles) after holding the specimen at 1050° C. for 100 hours in air versus the microcrack parameter of the as-fired samples. Preferred ranges for the microcrack index are denoted by regions A-B-C, D-E-F, G-H-I, J-K-L and M-N-O.

Still further, FIG. 6 depicts the elastic modulus versus temperature behavior for a comparative low-microcracked cordierite honeycomb ceramic (EX. 9.7) with glass-forming additives during heating to 1200° C. (open circles) and cooling back to room temperature (filled circles). The near overlapping of the heating and cooling trends signifies a near absence of microcracks. FIG. 7 depicts the elastic modulus versus temperature behavior during heating to 1200° C. (open circles) and cooling back to room temperature (filled circles) for the comparative low-microcracked cordierite honeycomb ceramic from FIG. 6 (EX. 9.7) after the sample was exposed to 1050° C. for 100 hours in air. Large hysteresis between the heating and cooling curves relative to the as-fired sample in FIG. 6 indicates an increase in microcracking after exposure at 1050° C.

Figure 3:
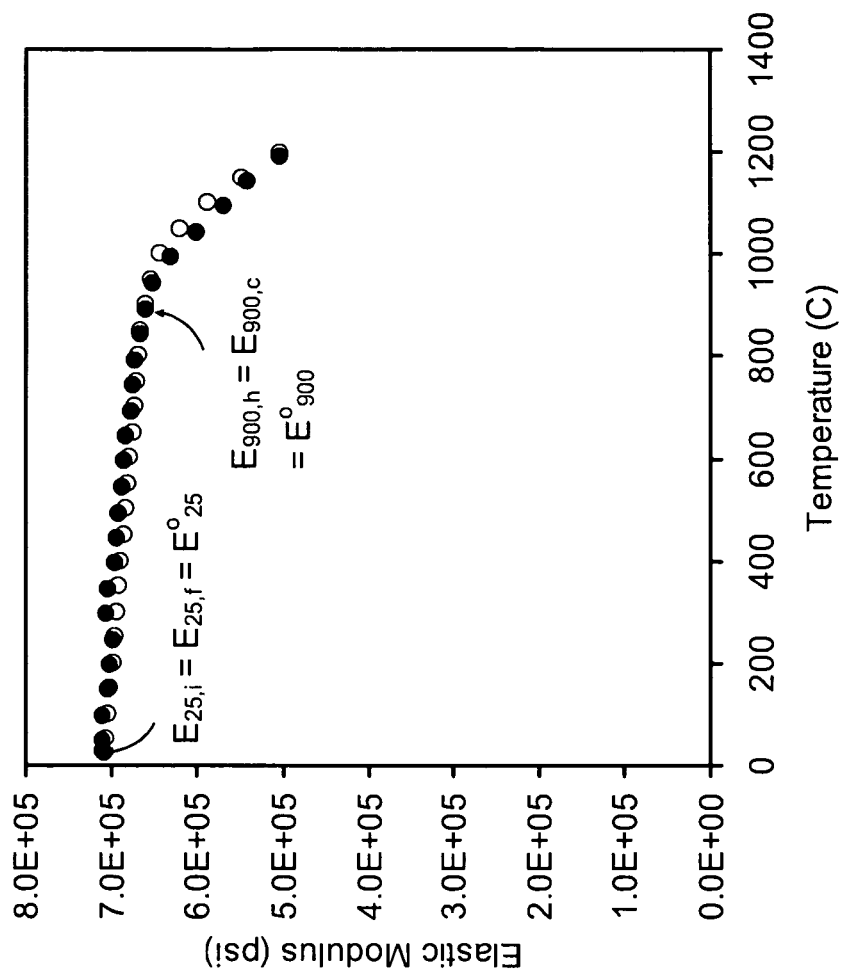
FIG. 3 shows the elastic modulus versus temperature behavior during heating to 1200° C. (open circles) and cooling back to room temperature (filled circles) for the same non-microcracked cordierite honeycomb ceramic of FIG. 1 (EX. 10.5) after the sample was exposed to 1050° C. for 100 hours in air. The near overlapping of the heating and cooling trends signifies a virtual absence of microcracks.

The inventive examples in Tables 10 and 11 demonstrate methods of the present invention whereby the use of a mullite raw material reduces the amount of microcracking in the as-fired body such that the $E_{900° C.}/E_{25° C.}$ is not more than 0.99 and the microcrack parameter is not more than 0.07. Furthermore, examples 10.1 to 10.6 illustrate bodies of the present invention in which the ratio $E_{900° C.}/E_{25° C.}$ is not more than 0.99, or the microcrack parameter is not more than 0.07, both before and after exposure to 1050° C. in air for 100 hours. Furthermore, example 10.5 illustrates a body of the present invention in which the strength retention, $(MOR)_h/(MOR)_i$, is 0.92 (92%) after 1050° C. for 100 hours. Example 10.1 demonstrates excellent stability against microcrack formation after treatment in nitric acid. Examples 10.5, 11.7, and 11.9 further show bodies in which the calculated thermal shock parameter is at least 450° C. Further, FIG. 1 also depicts the elastic modulus versus temperature behavior for the inventive non-microcracked cordierite honeycomb ceramic of example 10.5 during heating to 1200° C. (open circles) and cooling back to room temperature (filled circles). The near overlapping of the heating and cooling trends signifies a virtual absence of microcracks. Similarly, FIG. 3 shows the elastic modulus versus temperature behavior during heating to 1200° C. (open circles) and cooling back to room temperature (filled circles) for the same non-microcracked cordierite honeycomb ceramic of example 10.5 after the sample was exposed to 1050° C. for 100 hours in air. The near overlapping of the heating and cooling trends signifies the stability and continued virtual absence of microcracks.

The inventive examples in Table 12 demonstrate methods of the present invention whereby the use of a kyanite raw material reduces the amount of microcracking in the as-fired body such that the $E_{900° C.}/E_{25° C.}$ is not more than 0.99, or the microcrack parameter is not more than 0.07. Furthermore, examples 12.2, 12.3, and 12.6 illustrate bodies of the present invention in which the ratio $E_{900° C.}/E_{25° C.}$ is not more than 0.99, and the microcrack parameter is not more than 0.07, both before and after exposure to 1050° C. in air for 100 hours. Example 12.3 demonstrates a strength retention, $(MOR)_h/(MOR)_i$, of 0.82 (82%) after 1050° C. for 100 hours. Examples 12.2 and 12.3 further exhibit thermal shock parameters of greater than 450° C.

The inventive examples in Tables 13 and 14 demonstrate methods of the present invention whereby the use of a spinel raw material in combination with kaolin reduces the amount of microcracking in the as-fired body such that the $E_{900° C.}/E_{25° C.}$ is not more than 0.99 or the microcrack parameter is not more than 0.07. Furthermore, examples 13.1 to 13.7, 14.1, 14.2, and 14.6 illustrate bodies of the present invention in which the ratio $E_{900° C.}/E_{25° C.}$ is not more than 0.99, and the microcrack parameter is not more than 0.07, both before and after exposure to 1050° C. in air for 100 hours. Example 14.6 illustrates a strength retention, $(MOR)_h/(MOR)_i$, of 0.96 (96%) after 1050° C. for 100 hours. Examples 14.1 to 14.6 further demonstrate bodies in which the computed thermal shock parameter is at least 450° C.

The inventive examples in Table 15 illustrate methods of the present invention whereby the use of a magnesium oxide forming raw material in combination with kaolin reduces the amount of microcracking in the as-fired body such that the $E_{900° C.}/E_{25° C.}$ is not more than 0.99 or the microcrack parameter is not more than 0.07. Furthermore, examples 15.2, 15.6, and 15.8 illustrate bodies of the present invention in which the ratio $E_{900° C.}/E_{25° C.}$ is not more than 0.99, a microcrack parameter is not more than 0.07, and a strength retention of 0.71 to 1.0 (71% to 100%) after 100 hours at 1050° C. Examples 15.1, 15.2, 15.5, 15.6, and 15.8 further demonstrate honeycomb bodies in which the computed thermal shock parameter is at least 450° C.

Raw materials used in the examples are disclosed in Table 1 below. If not stated, the values for the oxides are listed as weight percentages. The values of the morphology index for Talcs A, B, and C are 0.88, 0.90, and 0.94, respectively.

TABLE 1

Exemplary Raw Materials

| Raw Material | $D_{10}$ | $D_{50}$ | $D_{90}$ | MgO | $Al_2O_3$ | $SiO_2$ | $Fe_2O_3$ | $TiO_2$ | $Na_2O$ | $K_2O$ | CaO | LOI |
|---|---|---|---|---|---|---|---|---|---|---|---|---|
| Talc A | 2.4 | 5.5 | 12 | 30.17 | 0.09 | 60.6 | 2.16 | 0.000 | 0.010 | 0.000 | 0.18 | 5.5 |
| Talc B | 4.4 | 9.7 | 19 | 30.13 | 0.19 | 59.4 | 2.55 | 0.000 | 0.010 | 0.000 | 0.23 | 6.3 |
| Talc C | 9.4 | 24 | 47 | 30.14 | 0.19 | 60.6 | 2.30 | 0.000 | 0.010 | 0.000 | 0.12 | 5.4 |
| Calcined Talc D | — | 18 | — | 31.60 | 0.63 | 62.1 | 0.83 | 0.013 | 0.036 | 0.005 | 0.15 | 4.5 |
| Chlorite A | 2.8 | 6.9 | 14 | 32.50 | 19.60 | 32.6 | 0.26 | 0.079 | 0.004 | 0.006 | 0.10 | 14.5 |
| Spinel B | 0.8 | 4.1 | 16 | 22.60 | 76.10 | 0.31 | 0.13 | 0.00 | 0.21 | 0.00 | 0.32 | 0 |
| Spinel C | 2.0 | 7.4 | 15 | 22.60 | 76.10 | 0.31 | 0.13 | 0.00 | 0.21 | 0.00 | 0.32 | 0 |
| Spinel D | 2.9 | 19.4 | 55 | 22.60 | 76.10 | 0.31 | 0.13 | 0.00 | 0.21 | 0.00 | 0.32 | 0 |
| Mg Hydroxide | 1.0 | 3.2 | 9.5 | 68.21 | 0.09 | 0.29 | 0.140 | 0.006 | 0.000 | 0.000 | 0.760 | 30.5 |
| Alumina A | 0.22 | 0.51 | 2.3 | 0.044 | 99.80 | 0.037 | 0.013 | 0.000 | 0.061 | 0.010 | 0.035 | 0 |
| Alumina B | 1.0 | 3.4 | 6.5 | 0.00 | 99.87 | 0.015 | 0.011 | 0.000 | 0.067 | 0.005 | 0.029 | 0 |
| Alumina C | 3.6 | 6.3 | 12 | 0.00 | 99.90 | 0.008 | 0.014 | 0.000 | 0.067 | 0.005 | 0.010 | 0 |
| Alumina D | 4.6 | 10 | 23 | 0.00 | 99.90 | 0.036 | 0.014 | 0.000 | 0.015 | 0.005 | 0.033 | 0 |
| Boehmite | 0.05 | 0.12 | 0.36 | 0.00 | 79.99 | 0.00 | 0.000 | 0.000 | 0.004 | 0.005 | 0.000 | 21.2 |
| Kaolin A | 0.9 | 3.4 | 9.2 | 0.12 | 38.02 | 44.80 | 0.30 | 1.50 | 0.060 | 0.050 | 0.05 | 14.4 |
| Kaolin B | 2.4 | 7.3 | 17 | 0.07 | 38.18 | 45.10 | 0.21 | 0.990 | 0.070 | 0.040 | 0.05 | 14.2 |
| Calcined Kaolin C | 1.3 | 2.6 | 7.2 | 0.00 | 44.30 | 52.20 | 0.40 | 1.70 | 0.07 | 0.08 | 0.03 | 1.2 |
| Mullite B | 1.1 | 6.0 | 20 | 0.02 | 76.10 | 23.30 | 0.04 | 0.01 | 0.13 | 0.06 | 0.05 | 0 |
| Mullite C | 2.9 | 12 | 28 | 0.02 | 76.10 | 23.30 | 0.04 | 0.01 | 0.13 | 0.06 | 0.05 | 0 |
| Mullite D | 3.3 | 18 | 45 | 0 | 73.19 | 25.65 | 0.22 | 0.02 | 0 | 0 | 0 | 0 |
| Kyanite A | 1.5 | 8.5 | 40 | 0.06 | 56.3 | 41.0 | 0.63 | 1.47 | 0.03 | 0.04 | 0.04 | 0 |
| Kyanite B | 1.6 | 12 | 53 | 0.06 | 56.3 | 41.0 | 0.63 | 1.47 | 0.03 | 0.04 | 0.04 | 0 |
| Kyanite C | 2.4 | 15 | 54 | 0.06 | 56.3 | 41.0 | 0.63 | 1.47 | 0.03 | 0.04 | 0.04 | 0 |
| Quartz A | 1.1 | 4.5 | 17 | 0.008 | 0.260 | 99.52 | 0.047 | 0.018 | 0.076 | 0.042 | 0.009 | 0 |
| Quartz B | 3.5 | 25 | 65 | 0.002 | 0.055 | 99.87 | 0.014 | 0.006 | 0.042 | 0.008 | 0.005 | 0 |
| Yttrium Oxide | 0.4 | 0.7 | 2.4 | — | — | — | — | — | — | — | — | — |
| Attapulgite | — | 2.0 × 0.003 | — | 10.47 | 9.57 | 50.90 | 2.97 | 0.35 | 0.58 | 0.58 | 2.20 | 21.5 |

TABLE 1-continued

Exemplary Raw Materials

| Raw Material | $D_{10}$ | $D_{50}$ | $D_{90}$ | MgO | $Al_2O_3$ | $SiO_2$ | $Fe_2O_3$ | $TiO_2$ | $Na_2O$ | $K_2O$ | CaO | LOI |
|---|---|---|---|---|---|---|---|---|---|---|---|---|
| Graphite A | 3.5 | 9.3 | 19 | — | — | — | — | — | — | — | — | — |
| Graphite B | 9.2 | 35 | 70 | — | — | — | — | — | — | — | — | — |
| Walnut Shell Flour A | 5.7 | 21 | 41 | — | — | — | — | — | — | — | — | — |
| Walnut Shell Flour B | 9.4 | 29 | 63 | — | — | — | — | — | — | — | — | — |
| Rice Starch | 3.7 | 5.4 | 8.0 | — | — | — | — | — | — | — | — | — |
| Polypropylene wax | — | 5.3 | — | — | — | — | — | — | — | — | — | — |

In the tables below, the inorganic materials listed are specified in weight % based on 100% of the total inorganics. The pore formers are listed in weight % by superaddition based on 100% of the weight of the inorganic materials. Metal oxide and attapulgite clay additions are listed in weight % by superaddition based on 100% of the weight of the inorganic materials.

TABLE 2

Honeycomb Composition Examples

| | Composition | | | | | | |
|---|---|---|---|---|---|---|---|
| | 1 | 2 | 3 | 4 | 5 | 6 | 7 |
| | Weight (pounds) | | | | | | |
| | 3.3 | 3.3 | 3.3 | 3.3 | 3.3 | 3.3 | 100 |
| Talc A | 42.35 | — | 41.40 | — | — | — | — |
| Talc B | — | — | — | — | — | — | 42.38 |
| Talc C | — | 42.35 | — | 41.40 | 42.33 | 42.33 | — |
| Boehmite | — | — | — | — | 5.00 | 5.00 | 5.00 |
| Alumina C | 34.16 | 34.16 | 27.08 | 27.08 | 30.21 | 30.21 | 30.12 |
| Kaolin B | — | — | 16.00 | 16.00 | — | — | — |
| Quartz A | 23.49 | 23.49 | 15.52 | 15.52 | 22.46 | 22.46 | 23.50 |
| Attapulgite | — | — | — | — | — | — | 5.00 |
| Yttrium Oxide | — | — | — | — | — | 1.13 | 1.00 |
| Graphite B | — | — | — | — | 40.00 | 40.00 | — |
| Walnut Shell Flour A | — | — | — | — | 20.00 | 20.00 | — |
| Walnut Shell Flour B | — | — | — | — | — | — | 40.00 |

TABLE 3

Honeycomb Composition Examples (Cont.)

| | Composition | | | | | | | |
|---|---|---|---|---|---|---|---|---|
| | 8 | 9 | 10 | 11 | 12 | 13 | 14 | 15 |
| | Weight (pounds) | | | | | | | |
| | 3.3 | 3.3 | 3.3 | 3.3 | 30 | 3.3 | 3.3 | 3.3 |
| Talc A | 42.21 | 42.21 | 42.21 | 42.21 | — | — | — | — |
| Talc B | — | — | — | — | 41.78 | — | — | — |
| Talc C | — | — | — | — | — | 42.21 | 42.28 | 42.32 |
| Mullite B | 44.77 | 44.77 | 44.77 | 44.77 | 39.13 | 44.77 | 22.39 | 8.95 |
| Alumina C | — | — | — | — | — | — | 17.08 | 27.33 |
| Boehmite | — | — | — | — | 5.00 | — | — | — |
| Quartz A | 13.02 | 13.02 | 13.02 | 13.02 | 14.09 | 13.02 | 18.26 | 21.40 |
| Yttrium Oxide | — | — | 1.00 | 1.00 | 1.00 | — | — | — |
| Graphite B | — | 15.00 | 15.00 | 40.00 | 15.00 | — | — | — |
| Walnut Shell Flour A | — | 5.00 | 5.00 | 20.00 | — | — | — | — |
| Walnut Shell Flour B | — | — | — | — | 40.00 | — | — | — |

TABLE 4

Honeycomb Composition Examples (Cont.)

| | Composition | | | | |
|---|---|---|---|---|---|
| | 16 | 17 | 18 | 19 | 20 |
| | Weight (pounds) | | | | |
| | 3.3 | 3.3 | — | 30 | 30 |
| Talc A | — | — | — | 41.70 | — |
| Talc B | — | — | — | — | 42.21 |
| Talc C | — | 24.26 | — | — | — |
| Magnesium Hydroxide | — | 8.00 | — | — | — |
| Calcined Talc D | 41.03 | — | — | — | — |
| Mullite B | 45.69 | 16.00 | — | — | — |
| Mullite C | — | — | — | — | 44.77 |
| Mullite D | — | — | — | 40.57 | — |
| Alumina C | — | 21.39 | — | — | — |
| Boehmite | — | — | — | 5.00 | — |
| Quartz A | 13.29 | 30.35 | — | 12.73 | 13.02 |
| Graphite A | — | — | — | 25.00 | — |
| Graphite B | — | — | — | — | — |
| Rice Starch | — | — | — | 20.00 | — |
| Walnut Shell Flour B | — | — | — | — | 40.00 |

TABLE 5

Honeycomb Composition Examples (Cont.)

| | Composition | | | | |
|---|---|---|---|---|---|
| | 21 | 22 | 23 | 24 | 25 |
| | Weight (pounds) | | | | |
| | 3.3 | 3.3 | 30 | 3.3 | 3.3 |
| Talc B | — | 41.22 | 23.54 | — | — |
| Talc C | — | — | — | 24.26 | — |
| Chlorite A | — | — | — | — | 39.28 |
| Magnesium Hydroxide | — | — | 8.00 | 8.00 | — |
| Calcined Talc D | 40.43 | — | — | — | — |
| Kyanite A | 57.76 | — | — | 4.00 | 43.81 |
| Kyanite B | — | 52.20 | — | — | — |
| Kyanite C | — | — | 25.00 | — | — |
| Boehmite | — | 5.00 | 5.00 | — | — |
| Alumina C | 1.81 | — | 14.99 | 31.31 | — |
| Quartz A | — | 1.58 | 23.47 | 32.43 | 16.91 |
| Yttrium Oxide | — | 1.00 | — | — | — |
| Graphite B | — | 15.00 | 15.00 | — | — |
| Walnut Shell Flour B | — | 40.00 | 40.00 | — | — |

TABLE 6

Honeycomb Composition Examples (Cont.)

| | Composition | | | | | | |
|---|---|---|---|---|---|---|---|
| | 26 | 27 | 28 | 29 | 30 | 31 | 32 |
| | Weight (pounds) | | | | | | |
| | 3.3 | 3.3 | 3.3 | 3.3 | 3.3 | 3.3 | 3.3 |
| Talc A | 25.00 | — | 25.00 | 25.00 | 25.00 | 25.00 | — |
| Talc C | — | 25.00 | — | — | — | — | 33.20 |
| Spinel B | 23.47 | 23.47 | 23.47 | 23.47 | 23.47 | 23.47 | 11.74 |
| Kaolin B | 16.00 | 16.00 | 16.00 | 16.00 | 16.00 | 16.00 | 16.00 |
| Alumina C | 9.40 | 9.40 | 9.40 | 9.40 | 9.40 | 9.40 | 18.24 |
| Quartz A | 26.12 | 26.12 | 26.12 | 26.12 | 26.12 | 26.12 | 20.82 |
| Attapulgite | — | — | — | — | 5.00 | 5.00 | — |
| Yttrium Oxide | — | — | — | 1.00 | — | 1.00 | — |
| Graphite B | — | — | 15.00 | 40.00 | 15.00 | 40.00 | — |
| Walnut Shell Flour A | — | — | 5.00 | 20.00 | 5.00 | 20.00 | — |

TABLE 7

Honeycomb Composition Examples (Cont.)

| | Composition | | | |
|---|---|---|---|---|
| | 33 | 34 | 35 | 36 |
| | Weight (pounds) | | | |
| | 30 | 30 | 30 | 30 |
| Talc A | — | — | — | 25.00 |
| Talc B | 25.00 | 25.00 | 25.00 | — |
| Spinel B | 23.47 | 23.47 | — | — |
| Spinel C | — | — | — | 23.47 |
| Spinel D | — | — | 22.83 | — |
| Kaolin B | 16.00 | 16.00 | 16.00 | 16.00 |
| Alumina B | — | — | — | 9.40 |
| Alumina C | 9.40 | 9.40 | 5.58 | — |
| Boehmite | — | — | 5.00 | — |
| Quartz A | 26.12 | 26.12 | 25.58 | 26.12 |
| Yttrium Oxide | — | 1.00 | — | — |
| Polypropylene Wax | — | — | — | 20.00 |

TABLE 7-continued

Honeycomb Composition Examples (Cont.)

| | Composition | | | |
|---|---|---|---|---|
| | 33 | 34 | 35 | 36 |
| | Weight (pounds) | | | |
| | 30 | 30 | 30 | 30 |
| Graphite A | — | — | — | 15.00 |
| Graphite B | 15.00 | 15.00 | 15.00 | — |
| Walnut Shell Flour B | 40.00 | 40.00 | 40.00 | — |

TABLE 8

Honeycomb Composition Examples (Cont.)

| | Composition | | | | | | |
|---|---|---|---|---|---|---|---|
| | 37 | 38 | 39 | 40 | 41 | 42 | 43 |
| | Weight (pounds) | | | | | | |
| | 30 | 30 | 3.3 | 3.3 | 30 | 30 | 30 |
| Talc A | 23.37 | — | — | 23.37 | 14.35 | 14.35 | 14.35 |
| Talc C | — | 23.37 | 23.37 | — | — | — | — |
| Magnesium Hydroxide | 8.00 | 8.00 | 8.00 | 8.00 | 12.00 | 12.00 | 12.00 |
| Kaolin A | 16.00 | — | — | 16.00 | 16.00 | — | — |
| Kaolin B | — | 16.00 | — | — | — | 16.00 | 16.00 |
| Calcined Kaolin C | — | — | — | — | 10.00 | — | — |
| Alumina A | 26.51 | — | — | 26.51 | — | — | 26.23 |
| Alumina C | — | — | — | — | 21.64 | 26.23 | — |
| Alumina D | — | — | 26.51 | — | — | — | — |
| Quartz A | 26.12 | 26.12 | — | 26.12 | 26.01 | 31.42 | — |
| Quartz B | — | — | 26.12 | — | — | — | — |
| Yttrium Oxide | — | — | — | — | — | — | 1.00 |
| Polypropylene Wax | — | — | — | 20.00 | — | — | — |
| Graphite A | 20.00 | — | — | — | 15.00 | 20.00 | 15.00 |
| Graphite B | — | 15.00 | — | — | — | — | — |
| Rice Starch | 20.00 | — | — | — | — | 20.00 | 15.00 |
| Walnut Shell Flour B | — | 35.00 | — | — | — | — | — |

TABLE 9

Honeycomb Property Examples

| | Example Number | | | | | | |
|---|---|---|---|---|---|---|---|
| | 9.1 | 9.2 | 9.3 | 9.4 | 9.5 | 9.6 | 9.7 |
| | Composition Code | | | | | | |
| | 1 | 2 | 3 | 4 | 5 | 6 | 7 |
| 750-1000 Rate (° C./h) | 50 | 50 | 50 | 50 | 75 | 75 | 35 |
| 1000-1200 Rate (° C./h) | 50 | 50 | 50 | 50 | 20 | 20 | 75 |
| 1200-$T_{max}$ Rate (° C./h) | 50 | 50 | 50 | 50 | 10 | 10 | 6 |
| Maximum Temperature (° C.) | 1400 | 1400 | 1400 | 1400 | 1400 | 1400 | 1425 |
| Hold Time (h) | 20 | 20 | 20 | 20 | 20 | 20 | 30 |
| Pore Volume (ml/g) | 0.2733 | 0.2816 | 0.4523 | 0.3776 | 0.8055 | 0.7805 | 0.5132 |
| % Porosity | 41.5 | 42.4 | 54.1 | 49.1 | 67.5 | 66.0 | 55.1 |
| $d_{10}$ | 5.6 | 5.0 | 3.1 | 5.4 | 14.3 | 11.9 | 12.9 |
| $d_{25}$ | 6.8 | 5.8 | 4.7 | 9.2 | 17.7 | 14.9 | 15.4 |
| $d_{50}$ | 7.9 | 6.9 | 6.4 | 12.5 | 21.6 | 18.0 | 18.7 |
| $d_{75}$ | 9.0 | 7.9 | 7.4 | 14.5 | 25.4 | 21.5 | 23.1 |
| $d_{90}$ | 10.7 | 8.8 | 9.0 | 16.6 | 35.3 | 32.1 | 37.8 |
| $(d_{50} - d_{10})/d_{50} = d_f$ | 0.29 | 0.27 | 0.51 | 0.57 | 0.34 | 0.34 | 0.31 |
| $(d_{90} - d_{50})/d_{50} = d_c$ | 0.35 | 0.29 | 0.40 | 0.33 | 0.63 | 0.78 | 1.02 |
| $(d_{90} - d_{10})/d_{50} = d_b$ | 0.64 | 0.56 | 0.91 | 0.90 | 0.97 | 1.13 | 1.33 |
| PCF = % Porosity/$d_b$ | 65 | 76 | 59 | 54 | 69 | 59 | 41 |
| CTE, 25-800° C. ($10^{-7}$/° C.) | 10.1 | 9.0 | 9.5 | 7.7 | 9.4 | 10.6 | 15.0 |
| CTE, 200-1000° C. ($10^{-7}$/° C.) | 15.4 | 13.5 | 13.8 | 12.8 | 13.7 | 15.1 | 19.4 |
| CTE, 500-900° C. ($10^{-7}$/° C.) | 18.2 | 16.0 | 16.4 | 15.1 | 16.2 | 17.9 | 22.6 |
| % Mullite | 0.0 | 0.0 | 1.1 | 1.4 | 1.6 | 1.3 | 0 |
| % Spinel + Sapphirine | 3.6 | 6.6 | 0.0 | 1.3 | 2.6 | 2.0 | 1.2 |

TABLE 9-continued

Honeycomb Property Examples

| | Example Number | | | | | | |
|---|---|---|---|---|---|---|---|
| | 9.1 | 9.2 | 9.3 | 9.4 | 9.5 | 9.6 | 9.7 |
| | Composition Code | | | | | | |
| | 1 | 2 | 3 | 4 | 5 | 6 | 7 |
| % Alumina | 0.0 | 0.7 | 0.0 | 0.0 | 0.0 | 0.0 | 0.0 |
| Axial I-ratio, $I_A$ | 0.49 | 0.42 | 0.50 | 0.52 | 0.39 | 0.40 | 0.58 |
| Transverse I-ratio, $I_T$ | 0.86 | 0.85 | 0.80 | 0.81 | 0.86 | 0.86 | 0.74 |
| $\Delta I = I_T - I_A$ | 0.37 | 0.43 | 0.30 | 0.29 | 0.47 | 0.46 | 0.16 |
| Cell Geometry | Rod | Rod | Rod | Rod | Rod | Rod | 275/8 |
| CFA | — | — | — | — | — | — | 0.248 |
| MOR (psi) | — | — | — | — | — | — | 739 |
| MOR/CFA (psi) | — | — | — | — | — | — | 2983 |
| $E_{25°C.}$ ($10^6$ psi) | 3.17 | 2.59 | 2.32 | 2.14 | 0.558 | 0.740 | 0.482 |
| $E_{900°C.}$ ($10^6$ psi) | 3.73 | 3.09 | 2.52 | 2.54 | 0.533 | 0.668 | 0.441 |
| $E_{900°C.}/E_{25°C.}$ | 1.177 | 1.193 | 1.086 | 1.187 | 0.955 | 0.903 | 0.915 |
| Microcrack Parameter $Nb^3$ | 0.320 | 0.307 | 0.290 | 0.389 | 0.035 | 0.014 | 0.020 |
| $E_{900°C.}/E_{25°C.}$ after 100 h at 1050° C. | — | — | — | — | 1.027 | 1.001 | 1.097 |
| $Nb^3$ after 100 h at 1050° C. | — | — | — | — | 0.099 | 0.081 | 0.178 |
| MOR/E | — | — | — | — | — | — | 0.153% |
| TSP (° C.) | — | — | — | — | — | — | 680 |
| TSR = TSP + 500 (° C.) | — | — | — | — | — | — | 1180 |
| TSP* (° C.) | — | — | — | — | — | — | 791 |
| TSR* = TSP + 200 (° C.) | — | — | — | — | — | — | 991 |

TABLE 10

Honeycomb Property Examples (Cont.)

| | Example Number | | | | | | | |
|---|---|---|---|---|---|---|---|---|
| | 10.1 | 10.2 | 10.3 | 10.4 | 10.5 | 10.6 | 10.7 | 10.8 |
| | Composition Code | | | | | | | |
| | 8 | 9 | 10 | 11 | 12 | 13 | 14 | 15 |
| 750-1000 Rate (° C./h) | 50 | 75 | 75 | 75 | 75 | 50 | 75 | 75 |
| 1000-1200 Rate (° C./h) | 50 | 20 | 20 | 20 | 20 | 50 | 20 | 20 |
| 1200-$T_{max}$ Rate (° C./h) | 50 | 10 | 10 | 10 | 10 | 50 | 10 | 10 |
| Maximum Temperature (° C.) | 1400 | 1400 | 1400 | 1400 | 1380 | 1400 | 1400 | 1400 |
| Hold Time (h) | 20 | 20 | 20 | 20 | 20 | 20 | 20 | 20 |
| Pore Volume (ml/g) | 0.3089 | 0.5435 | 0.2850 | 0.3603 | 0.5861 | 0.3804 | 0.4144 | 0.4311 |
| % Porosity | 43.8 | 58.6 | 42.4 | 48.0 | 60.1 | 49.1 | 51.2 | 52.4 |
| $d_{10}$ | 3.3 | 3.6 | 5.0 | 6.4 | 5.3 | 3.6 | 3.1 | 3.3 |
| $d_{25}$ | 4.9 | 5.7 | 6.4 | 8.4 | 7.3 | 8.9 | 6.1 | 6.0 |
| $d_{50}$ | 6.1 | 7.9 | 7.9 | 9.9 | 9.2 | 13.5 | 9.9 | 9.8 |
| $d_{75}$ | 6.7 | 9.5 | 9.2 | 11.1 | 10.7 | 17.4 | 12.7 | 12.8 |
| $d_{90}$ | 8.4 | 11.2 | 13.8 | 15.1 | 13.6 | 26.6 | 19.3 | 19.6 |
| $(d_{50} - d_{10})/d_{50} = d_f$ | 0.46 | 0.55 | 0.37 | 0.35 | 0.42 | 0.74 | 0.68 | 0.66 |
| $(d_{90} - d_{50})/d_{50} = d_c$ | 0.38 | 0.41 | 0.76 | 0.53 | 0.47 | 0.97 | 0.95 | 1.00 |
| $(d_{90} - d_{10})/d_{50} = d_b$ | 0.84 | 0.96 | 1.13 | 0.88 | 0.90 | 1.70 | 1.63 | 1.66 |
| PCF = % Porosity/$d_b$ | 52 | 61 | 38 | 55 | 67 | 29 | 31 | 32 |
| CTE, 25-800° C. ($10^{-7}$/° C.) | 14.9 | 13.1 | 14.7 | 15.4 | 16.5 | 14.3 | 13.6 | 13.7 |
| CTE, 200-1000° C. ($10^{-7}$/° C.) | 19.4 | 17.8 | 19.4 | 19.9 | 21.1 | 19.4 | 18.5 | 19.7 |
| CTE, 500-900° C. ($10^{-7}$/° C.) | 21.8 | 20.2 | 22.5 | 22.9 | 24.0 | 21.7 | 21.1 | 22.3 |
| % Mullite | 7.3 | 0.6 | 2.6 | 0.0 | 0.0 | 1.5 | 1.8 | 1.8 |
| % Spinel + Sapphirine | 0.0 | 1.0 | 0.0 | 0.8 | 1.5 | 0.8 | 1.2 | 3.6 |
| % Alumina | 0.0 | 0.0 | 0.0 | 0.0 | 0.0 | 0.0 | 0.0 | 0.0 |
| Axial I-ratio, $I_A$ | 0.57 | 0.59 | 0.58 | 0.59 | 0.60 | 0.60 | 0.60 | 0.56 |
| Transverse I-ratio, $I_T$ | 0.74 | 0.74 | 0.76 | 0.75 | 0.74 | 0.72 | 0.73 | 0.71 |
| $\Delta I = I_T - I_A$ | 0.17 | 0.15 | 0.18 | 0.16 | 0.14 | 0.12 | 0.13 | 0.15 |
| Cell Geometry | Rod | Rod | Rod | Rod | 330/13 | Rod | Rod | Rod |
| CFA | — | — | — | — | 0.417 | — | — | — |
| MOR (psi) | — | — | — | — | 949 | — | — | — |
| MOR/CFA (psi) | — | — | — | — | 2278 | — | — | — |
| $E_{25°C.}$ ($10^6$ psi) | 3.72 | 1.56 | 4.81 | 3.03 | 0.649 | 3.44 | 2.86 | 2.61 |
| $E_{900°C.}$ ($10^6$ psi) | 3.49 | 1.45 | 4.35 | 2.68 | 0.602 | 3.27 | 2.76 | 2.54 |
| $E_{900°C.}/E_{25°C.}$ | 0.938 | 0.929 | 0.904 | 0.884 | 0.928 | 0.951 | 0.965 | 0.973 |
| Microcrack Parameter $Nb^3$ | 0.019 | 0.019 | 0.000 | -0.035 | 0.010 | 0.022 | 0.049 | 0.053 |
| $E_{900°C.}/E_{25°C.}$ after 100 h at 1050° C. | 0.947 | 0.967 | 0.904 | 0.910 | 0.934 | 0.956 | — | — |
| $Nb^3$ after 100 h at 1050° C. | 0.011 | 0.035 | -0.007 | 0.004 | 0.007 | 0.021 | — | — |
| CTE (25-800) after 100 h at | — | — | — | — | 16.2 | — | — | — |

TABLE 10-continued

Honeycomb Property Examples (Cont.)

| | Example Number | | | | | | | |
|---|---|---|---|---|---|---|---|---|
| | 10.1 | 10.2 | 10.3 | 10.4 | 10.5 | 10.6 | 10.7 | 10.8 |
| | | | | Composition Code | | | | |
| | 8 | 9 | 10 | 11 | 12 | 13 | 14 | 15 |
| 1050 C. ($10^{-7}/°$ C.) | | | | | | | | |
| MOR after 100 h at 1050 C. (psi) | — | — | — | — | 869 | — | — | — |
| $E_{900° C.}/E_{25° C.}$ after acid treatment | 0.933 | — | — | — | — | — | — | — |
| $Nb^3$ after acid treatment | 0.009 | — | — | — | — | — | — | — |
| MOR/E | — | — | — | — | 0.146% | — | — | — |
| TSP (° C.) | — | — | — | — | 609 | — | — | — |
| TSR = TSP + 500 (° C.) | — | — | — | — | 1109 | — | — | — |
| TSP* (° C.) | — | — | — | — | 694 | — | — | — |
| TSR = TSP* + 200 (° C.) | — | — | — | — | 894 | — | — | — |

TABLE 11

Honeycomb Property Examples (Cont.)

| | Example Number | | | |
|---|---|---|---|---|
| | 11.1 | 11.2 | 11.7 | 11.9 |
| | | Composition Code | | |
| | 16 | 17 | 19 | 20 |
| 750-1000 Rate (° C./h) | 75 | 50 | 75 | 75 |
| 1000-1200 Rate (° C./h) | 20 | 50 | 20 | 20 |
| 1200-$T_{max}$ Rate (° C./h) | 10 | 50 | 10 | 10 |
| Maximum Temperature (° C.) | 1400 | 1400 | 1380 | 1400 |
| Hold Time (h) | 20 | 20 | 20 | 20 |
| Pore Volume (ml/g) | 0.3472 | 0.3617 | 0.5324 | 0.5844 |
| % Porosity | 46.3 | 48.3 | 57.8 | 59.0 |
| $d_{10}$ | 3.0 | 3.4 | 8.4 | 13.1 |
| $d_{25}$ | 6.4 | 4.8 | 11.8 | 15.7 |
| $d_{50}$ | 9.3 | 7.6 | 15.5 | 18.4 |
| $d_{75}$ | 11.1 | 10.9 | 23.6 | 21.7 |
| $d_{90}$ | 15.5 | 18.1 | 93.1 | 31.1 |
| $(d_{50} - d_{10})/d_{50} = d_f$ | 0.68 | 0.55 | 0.45 | 0.29 |
| $(d_{90} - d_{50})/d_{50} = d_c$ | 0.67 | 1.38 | 5.01 | 0.69 |
| $(d_{90} - d_{10})/d_{50} = d_b$ | 1.35 | 1.93 | 5.46 | 0.98 |
| PCF = % Porosity/$d_b$ | 34 | 25 | 11 | 60 |
| CTE, 25-800° C. ($10^{-7}/°$ C.) | 14.0 | 16.1 | 10.6 | 12.8 |
| CTE, 200-1000° C. ($10^{-7}/°$ C.) | 19.2 | 20.4 | 14.6 | 17.3 |
| CTE, 500-900° C. ($10^{-7}/°$ C.) | 21.3 | 22.7 | 17.3 | 19.8 |
| % Mullite | 0.8 | 2.5 | 1.8 | 1.6 |
| % Spinel + Sapphirine | 0.5 | 3.4 | 2.1 | 1.6 |
| % Alumina | 0 | 0 | 0 | 0 |
| Axial I-ratio, $I_A$ | 0.63 | 0.58 | 0.47 | 0.52 |
| Transverse I-ratio, $I_T$ | 0.7 | — | 0.83 | 0.82 |
| $\Delta I = I_T - I_A$ | 0.07 | — | 0.36 | 0.30 |
| Cell Geometry | Rod | Rod | 652/4.2 | 330/13 |
| CFA | — | — | 0.203 | 0.417 |
| MOR (psi) | — | — | 203 | 1066 |
| MOR/CFA (psi) | — | — | 1000 | 2559 |
| $E_{25° C.}$ ($10^6$ psi) | 3.65 | 2.31 | 2.39 | 0.581 |
| $E_{900° C.}$ ($10^6$ psi) | 3.48 | 2.23 | 2.35 | 0.541 |
| $E_{900° C.}/E_{25° C.}$ | 0.953 | 0.965 | 0.983 | 0.931 |
| Microcrack Parameter $Nb^3$ | 0.026 | 0.042 | 0.056 | 0.023 |
| $E_{900° C.}/E_{25° C.}$ after 100 h at 1050° C. | — | — | — | 0.959 |
| $Nb^3$ after 100 h at 1050° C. | — | — | — | 0.033 |
| CTE(25-800) after 100 h at 1050 C. ($10^{-7}/°$ C.) | — | — | — | 12.1 |
| MOR after 100 h at 1050 C. (psi) | — | — | — | 784 |
| MOR/E | — | — | 0.085% | 0.183% |
| TSP (° C.) | — | — | 492 | 925 |
| TSR = TSP + 500 (° C.) | — | — | 992 | 1425 |
| TSP* (° C.) | — | — | 580 | 1060 |
| TSR = TSP* + 200 (° C.) | — | — | 780 | 1260 |

TABLE 12

Honeycomb Property Examples (Cont.)

| | Example Number | | | | |
|---|---|---|---|---|---|
| | 12.1 | 12.2 | 12.3 | 12.4 | 12.6 |
| | Composition Code | | | | |
| | 21 | 22 | 23 | 24 | 25 |
| 750-1000 Rate (° C./h) | 75 | 75 | 75 | 50 | 50 |
| 1000-1200 Rate (° C./h) | 20 | 20 | 20 | 50 | 50 |
| 1200-$T_{max}$ Rate (° C./h) | 10 | 10 | 10 | 50 | 50 |
| Maximum Temperature (° C.) | 1400 | 1380 | 1380 | 1400 | 1400 |
| Hold Time (h) | 20 | 20 | 20 | 20 | 20 |
| Pore Volume (ml/g) | 0.2927 | 0.5791 | 0.6733 | 0.3803 | 0.3085 |
| % Porosity | 42.3 | 59.8 | 61.5 | 49.6 | 41.6 |
| $d_{10}$ | 2.6 | 6.3 | 9.1 | 3.7 | 2.0 |
| $d_{25}$ | 5.2 | 8.3 | 11.3 | 5.0 | 3.2 |
| $d_{50}$ | 7.9 | 10.3 | 13.3 | 7.5 | 4.7 |
| $d_{75}$ | 9.7 | 12.4 | 15.5 | 10.6 | 5.7 |
| $d_{90}$ | 13.2 | 16.4 | 20.3 | 19.9 | 7.3 |
| $(d_{50} - d_{10})/d_{50} = d_f$ | 0.66 | 0.39 | 0.32 | 0.51 | 0.57 |
| $(d_{90} - d_{50})/d_{50} = d_c$ | 0.68 | 0.58 | 0.52 | 1.65 | 0.54 |
| $(d_{90} - d_{10})/d_{50} = d_b$ | 1.34 | 0.97 | 0.84 | 2.16 | 1.11 |
| PCF = % Porosity/$d_b$ | 31 | 61 | 73 | 23 | 37 |
| CTE, 25-800° C. ($10^{-7}$/° C.) | 13.5 | 16.6 | 15.8 | 15.7 | 14.8 |
| CTE, 200-1000° C. ($10^{-7}$/° C.) | 18.4 | 21.1 | 19.9 | 18.6 | 19.7 |
| CTE, 500-900° C. ($10^{-7}$/° C.) | 20.6 | 24.1 | 22.5 | 20.4 | 22.2 |
| % Mullite | 1.2 | 0.6 | 1.3 | 0.0 | 0.0 |
| % Spinel + Sapphirine | 0.0 | 1.1 | 1.9 | 4.8 | 0.0 |
| % Alumina | 0.5 | 0.0 | 0.0 | 0.9 | 0.0 |
| Axial I-ratio, $I_A$ | 0.60 | 0.56 | 0.57 | 0.47 | 0.60 |
| Transverse I-ratio, $I_T$ | 0.73 | 0.76 | 0.76 | 0.78 | 0.73 |
| $\Delta I = I_T - I_A$ | 0.13 | 0.20 | 0.19 | 0.31 | 0.13 |
| Cell Geometry | Rod | 330/13 | 338/12.6 | Rod | Rod |
| CFA | — | 0.417 | 0.410 | — | — |
| MOR (psi) | — | 813 | 466 | — | — |
| MOR/CFA (psi) | — | 1952 | 1138 | — | — |
| $E_{25° C.}$ ($10^6$ psi) | 4.91 | 0.577 | 0.366 | 2.75 | 4.36 |
| $E_{900° C.}$ ($10^6$ psi) | 4.83 | 0.534 | 0.343 | 2.70 | 4.24 |
| $E_{900° C.}/E_{25° C.}$ | 0.983 | 0.925 | 0.937 | 0.982 | 0.972 |
| Microcrack Parameter $Nb^3$ | 0.047 | 0.011 | 0.018 | 0.077 | 0.036 |
| $E_{900° C.}/E_{25° C.}$ after 100 h at 1050° C. | — | 0.962 | 0.954 | — | 0.985 |
| $Nb^3$ after 100 h at 1050° C. | — | 0.032 | 0.029 | — | 0.038 |
| CTE (25-800) after 100 h at 1050 C. ($10^{-7}$/° C.) | — | 16.6 | 14.6 | — | — |
| MOR after 100 h at 1050 C. (psi) | — | 552 | 380 | — | — |
| MOR/E | — | 0.141% | 0.127% | — | — |
| TSP (° C.) | — | 585 | 567 | — | — |
| TSR = TSP + 500 (° C.) | — | 1085 | 1067 | — | — |
| TSP* (° C.) | — | 669 | 642 | — | — |
| TSR = TSP* + 200 (° C.) | — | 869 | 842 | — | — |

TABLE 13

Honeycomb Property Examples (Cont.)

| | Example Number | | | | | | |
|---|---|---|---|---|---|---|---|
| | 13.1 | 13.2 | 13.3 | 13.4 | 13.5 | 13.6 | 13.7 |
| | Composition Code | | | | | | |
| | 26 | 27 | 28 | 29 | 30 | 31 | 32 |
| 750-1000 Rate (° C./h) | 50 | 50 | 75 | 75 | 75 | 75 | 75 |
| 1000-1200 Rate (° C./h) | 50 | 50 | 20 | 20 | 20 | 20 | 20 |
| 1200-$T_{max}$ Rate (° C./h) | 50 | 50 | 10 | 10 | 10 | 10 | 10 |
| Maximum Temperature (° C.) | 1400 | 1400 | 1400 | 1400 | 1400 | 1400 | 1400 |
| Hold Time (h) | 20 | 20 | 20 | 20 | 20 | 20 | 20 |
| Pore Volume (ml/g) | 0.3290 | 0.3757 | 0.4961 | 0.6527 | 0.3263 | 0.4175 | 0.3832 |
| % Porosity | 45.7 | 48.8 | 56.2 | 63.6 | 45.5 | 51.6 | 49.0 |
| $d_{10}$ | 4.5 | 5.5 | 4.1 | 5.9 | 5.6 | 7.3 | 3.4 |
| $d_{25}$ | 6.3 | 9.2 | 6.0 | 8.3 | 7.2 | 9.1 | 5.8 |
| $d_{50}$ | 7.9 | 12.0 | 8.0 | 10.5 | 8.8 | 10.6 | 9.0 |
| $d_{75}$ | 9.2 | 15.4 | 9.3 | 11.8 | 10.4 | 11.6 | 11.7 |
| $d_{90}$ | 11.4 | 27.8 | 11.3 | 14.9 | 14.1 | 14.7 | 18.6 |
| $(d_{50} - d_{10})/d_{50} = d_f$ | 0.43 | 0.54 | 0.48 | 0.44 | 0.37 | 0.31 | 0.63 |

TABLE 13-continued

Honeycomb Property Examples (Cont.)

| | Example Number | | | | | | |
|---|---|---|---|---|---|---|---|
| | 13.1 | 13.2 | 13.3 | 13.4 | 13.5 | 13.6 | 13.7 |
| | Composition Code | | | | | | |
| | 26 | 27 | 28 | 29 | 30 | 31 | 32 |
| $(d_{90} - d_{50})/d_{50} = d_c$ | 0.44 | 1.31 | 0.42 | 0.42 | 0.60 | 0.39 | 1.06 |
| $(d_{90} - d_{10})/d_{50} = d_b$ | 0.88 | 1.85 | 0.90 | 0.86 | 0.97 | 0.70 | 1.69 |
| PCF = % Porosity/$d_b$ | 52 | 26 | 62 | 74 | 47 | 74 | 29 |
| CTE, 25-800° C. ($10^{-7}$/° C.) | 14.1 | 15.5 | 13.4 | 14.0 | 15.5 | 15.8 | 14.8 |
| CTE, 200-1000° C. ($10^{-7}$/° C.) | 18.9 | 20.2 | 18.2 | 18.3 | 20.1 | 19.9 | 19.3 |
| CTE, 500-900° C. ($10^{-7}$/° C.) | 21.4 | 22.9 | 20.6 | 20.8 | 23.1 | 22.8 | 21.5 |
| % Mullite | 0.0 | 0.7 | 0.0 | 0.0 | 0.0 | 0.0 | 0.8 |
| % Spinel + Sapphirine | 1.6 | 2.2 | 2.8 | 1.3 | 0.6 | 0.5 | 1.4 |
| % Alumina | 0.0 | 0.0 | 0.0 | 0.0 | 0.0 | 0.0 | 0.0 |
| Axial I-ratio, $I_A$ | 0.57 | 0.57 | 0.56 | 0.57 | 0.57 | 0.59 | 0.59 |
| Transverse I-ratio, $I_T$ | 0.73 | 0.71 | 0.73 | 0.74 | 0.74 | 0.72 | 0.72 |
| $\Delta I = I_T - I_A$ | 0.16 | 0.14 | 0.17 | 0.17 | 0.17 | 0.13 | 0.13 |
| Cell Geometry | Rod | Rod | Rod | Rod | Rod | Rod | Rod |
| $E_{25° C.}$ ($10^6$ psi) | 3.50 | 3.79 | 1.99 | 1.04 | 3.54 | 2.88 | 3.48 |
| $E_{900° C.}$ ($10^6$ psi) | 3.28 | 3.46 | 1.88 | 0.989 | 3.17 | 2.42 | 3.28 |
| $E_{900° C.}/E_{25° C.}$ | 0.937 | 0.913 | 0.945 | 0.951 | 0.895 | 0.855 | 0.943 |
| Microcrack Parameter $Nb^3$ | 0.012 | −0.010 | 0.023 | 0.025 | 0.009 | −0.005 | 0.022 |
| $E_{900° C.}/E_{25° C.}$ after 100 h at 1050° C. | 0.960 | 0.943 | 0.944 | 0.963 | 0.866 | 0.953 | 0.959 |
| $Nb^3$ after 100 h at 1050° C. | 0.024 | 0.008 | 0.010 | 0.018 | 0.007 | 0.016 | 0.021 |
| $E_{900° C.}/E_{25° C.}$ after acid treatment | 0.957 | — | — | — | — | — | — |
| $Nb^3$ after acid treatment | 0.026 | — | — | — | — | — | — |

TABLE 14

Honeycomb Property Examples (Cont.)

| | Example Number | | | |
|---|---|---|---|---|
| | 14.1 | 14.2 | 14.3 | 14.6 |
| | Composition Code | | | |
| | 33 | 34 | 35 | 36 |
| 750-1000 Rate (° C./h) | 75 | 75 | 75 | 75 |
| 1000-1200 Rate (° C./h) | 20 | 20 | 20 | 20 |
| 1200-$T_{max}$ Rate (° C./h) | 10 | 10 | 10 | 10 |
| Maximum Temperature (° C.) | 1400 | 1400 | 1380 | 1390 |
| Hold Time (h) | 20 | 20 | 20 | 20 |
| Pore Volume (ml/g) | 0.5630 | 0.4924 | 0.5704 | 0.6368 |
| % Porosity | 59.0 | 56.3 | 58.3 | 61.5 |
| $d_{10}$ | 8.0 | 7.6 | 14.4 | 4.6 |
| $d_{25}$ | 9.6 | 9.1 | 16.5 | 6.3 |
| $d_{50}$ | 11.3 | 10.4 | 18.4 | 8.1 |
| $d_{75}$ | 12.6 | 11.9 | 20.5 | 10.1 |
| $d_{90}$ | 15.7 | 15.5 | 26.8 | 16.6 |
| $(d_{50} - d_{10})/d_{50} = d_f$ | 0.29 | 0.27 | 0.22 | 0.43 |
| $(d_{90} - d_{50})/d_{50} = d_c$ | 0.39 | 0.49 | 0.46 | 1.06 |
| $(d_{90} - d_{10})/d_{50} = d_b$ | 0.68 | 0.76 | 0.68 | 1.49 |
| PCF = % Porosity/$d_b$ | 86 | 74 | 86 | 41 |
| CTE, 25-800° C. ($10^{-7}$/° C.) | 20.3 | 18.8 | 23.1 | 12.1 |
| CTE, 200-1000° C. ($10^{-7}$/° C.) | 25.1 | 23.3 | 27.5 | 15.9 |
| CTE, 500-900° C. ($10^{-7}$/° C.) | 27.2 | 26.1 | 30.6 | 18.7 |
| % Mullite | 0.0 | 0.0 | 0.0 | 0.0 |
| % Spinel + Sapphirine | 0.8 | 0.9 | 13.4 | 1.8 |
| % Alumina | 0.0 | 0.0 | 0.0 | 0.0 |
| Axial I-ratio, $I_A$ | 0.57 | 0.60 | 0.53 | 0.47 |
| Transverse I-ratio, $I_T$ | — | 0.71 | 0.68 | 0.83 |
| $\Delta I = I_T - I_A$ | — | 0.11 | 0.15 | 0.36 |
| Cell Geometry | 330/13 | 330/13 | 330/13 | 600/4 |
| CFA | 0.417 | 0.417 | 0.417 | 0.186 |
| MOR (psi) | 1189 | 1623 | 909 | 179 |
| MOR/CFA (psi) | 2854 | 3896 | 2182 | 961 |
| $E_{25° C.}$ ($10^6$ psi) | 0.591 | 0.819 | 0.482 | 0.192 |
| $E_{900° C.}$ ($10^6$ psi) | 0.534 | 0.739 | 0.445 | 0.182 |
| $E_{900° C.}/E_{25° C.}$ | 0.904 | 0.902 | 0.923 | 0.948 |
| Microcrack Parameter $Nb^3$ | 0.005 | 0.005 | 0.039 | 0.029 |
| $E_{900° C.}/E_{25° C.}$ after 100 h at 1050° C. | 0.939 | 0.934 | — | 0.990 |
| $Nb^3$ after 100 h at 1050° C. | 0.008 | 0.010 | — | 0.067 |

TABLE 14-continued

Honeycomb Property Examples (Cont.)

| | Example Number | | | |
|---|---|---|---|---|
| | 14.1 | 14.2 | 14.3 | 14.6 |
| | Composition Code | | | |
| | 33 | 34 | 35 | 36 |
| CTE(25-800) after 100 h at 1050 C ($10^{-7}$/° C.) | — | — | — | 10.1 |
| MOR after 100 h at 1050 C. (psi) | — | — | — | 171 |
| MOR/E | 0.201% | 0.198% | 0.189% | 0.093% |
| TSP (° C.) | 740 | 759 | 616 | 500 |
| TSR = TSP + 500 (° C.) | 1240 | 1259 | 1116 | 1000 |
| TSP* (° C.) | 800 | 850 | 685 | 586 |
| TSR = TSP* + 200 (° C.) | 1000 | 1050 | 885 | 786 |

TABLE 15

Honeycomb Property Examples (Cont.)

| | Example Number | | | | | | |
|---|---|---|---|---|---|---|---|
| | 15.1 | 15.2 | 15.3 | 15.4 | 15.5 | 15.6 | 15.8 |
| | Composition Code | | | | | | |
| | 37 | 38 | 39 | 40 | 41 | 42 | 43 |
| 750-1000 Rate (° C./h) | 20 | 20 | 75 | 20 | 20 | 20 | 20 |
| 1000-1200 Rate (° C./h) | 20 | 20 | 20 | 20 | 20 | 20 | 20 |
| 1200-$T_{max}$ Rate (° C./h) | 10 | 10 | 10 | 10 | 10 | 10 | 10 |
| Maximum Temperature (° C.) | 1380 | 1380 | 1380 | 1380 | 1380 | 1380 | 1380 |
| Hold Time (h) | 20 | 20 | 20 | 20 | 20 | 20 | 20 |
| Pore Volume (ml/g) | 0.5892 | 0.7520 | 0.4312 | 0.3091 | 0.8340 | 0.7440 | 0.5144 |
| % Porosity | 59.2 | 64.8 | 52.1 | 43.5 | 67.1 | 65.3 | 55.2 |
| $d_{10}$ | 2.0 | 9.4 | 5.4 | 1.0 | 5.4 | 6.1 | 2.9 |
| $d_{25}$ | 2.4 | 11.9 | 8.7 | 1.4 | 7.2 | 8.1 | 3.4 |
| $d_{50}$ | 2.8 | 14.1 | 12.7 | 2.1 | 9.1 | 10.2 | 4.1 |
| $d_{75}$ | 3.2 | 16.6 | 16.0 | 2.9 | 10.7 | 13.6 | 5.8 |
| $d_{90}$ | 3.5 | 22.3 | 22.9 | 4.0 | 14.7 | 33.8 | 10.1 |
| $(d_{50} - d_{10})/d_{50} = d_f$ | 0.29 | 0.33 | 0.58 | 0.51 | 0.40 | 0.40 | 0.30 |
| $(d_{90} - d_{50})/d_{50} = d_c$ | 0.25 | 0.59 | 0.81 | 0.90 | 0.61 | 2.32 | 1.44 |
| $(d_{90} - d_{10})/d_{50} = d_b$ | 0.54 | 0.92 | 1.38 | 1.41 | 1.02 | 2.71 | 1.74 |
| PCF = % Porosity/$d_b$ | 109 | 71 | 38 | 31 | 66 | 24 | 32 |
| CTE, 25-800° C. ($10^{-7}$/° C.) | 10.3 | 15.0 | 18.0 | 13.9 | 14.0 | 14.6 | 17.4 |
| CTE, 200-1000° C. ($10^{-7}$/° C.) | 15.0 | 19.5 | 21.8 | 18.6 | 18.6 | 18.6 | 21.4 |
| CTE, 500-900° C. ($10^{-7}$/° C.) | 17.4 | 22.3 | 24.0 | 20.9 | 21.2 | 21.1 | 24.2 |
| % Mullite | 0 | 0 | 0 | 0.7 | 0.6 | 0 | 0 |
| % Spinel + Sapphirine | 0.5 | 5.1 | 4.4 | 0 | 1.2 | 1.4 | 0 |
| % Alumina | 0 | 0 | 0 | 0 | 0 | 0 | 0 |
| Axial I-ratio, $I_A$ | 0.53 | 0.59 | 0.61 | 0.60 | 0.62 | 0.61 | 0.70 |
| Transverse I-ratio, $I_T$ | 0.79 | 0.74 | 0.70 | 0.72 | 0.68 | 0.72 | 0.61 |
| $\Delta I = I_T - I_A$ | 0.26 | 0.15 | 0.09 | 0.12 | 0.06 | 0.11 | −0.09 |
| Cell Geometry | 330/13 | 330/13 | Rod | Rod | 375/10.5 | 570/4.2 | 385/4.5 |
| CFA | 0.417 | 0.417 | — | — | 0.365 | 0.190 | 0.169 |
| MOR (psi) | 906 | 563 | — | — | 196 | 102 | 411 |
| MOR/CFA (psi) | 2175 | 1352 | — | — | 535 | 537 | 2435 |
| $E_{25° C.}$ ($10^6$ psi) | 7.60 | 2.84 | 1.96 | 4.92 | 0.164 | 0.095 | 0.237 |
| $E_{900° C.}$ ($10^6$ psi) | 7.61 | 2.66 | 1.94 | 4.83 | 0.159 | 0.090 | 0.216 |
| $E_{900° C.}/E_{25° C.}$ | 1.001 | 0.937 | 0.990 | 0.982 | 0.970 | 0.950 | 0.911 |
| Microcrack Parameter $Nb^3$ | 0.068 | 0.017 | 0.054 | 0.047 | 0.043 | 0.028 | 0.011 |
| $E_{900° C.}/E_{25° C.}$ after 100 h at 1050° C. | — | 0.961 | — | — | — | 0.987 | 0.932 |
| $Nb^3$ after 100 h at 1050° C. | — | 0.030 | — | — | — | 0.042 | 0.015 |
| CTE (25-800) after 100 h at 1050 C. ($10^{-7}$/° C.) | — | 14.7 | — | — | — | 16.2 | 17.5 |
| MOR after 100 h at 1050 C. (psi) | — | 397 | — | — | — | 95 | 413 |
| MOR/E | 0.119% | 0.198% | — | — | 0.119% | 0.108% | 0.174% |
| TSP (° C.) | 684 | 891 | — | — | 562 | 512 | 716 |
| TSR = TSP + 500 (° C.) | 1184 | 1391 | — | — | 1062 | 1012 | 1216 |
| TSP* (° C.) | 795 | 1020 | — | — | 642 | 580 | 809 |
| TSR = TSP* + 200 (° C.) | 995 | 1220 | — | — | 842 | 780 | 1009 |

In one set of embodiments, a porous ceramic honeycomb body is disclosed comprising: a primary cordierite ceramic phase; a total porosity % P of at least 40%; and a thermal shock parameter (TSP) of at least 450° C., wherein TSP is $(MOR_{25°\,C.}/E_{25°\,C.})(CTE_{500\text{-}900°\,C.})^{-1}$, $MOR_{25°\,C.}$ is the modulus of rupture strength at 25° C., $E_{25°\,C.}$ is the Young's elastic modulus at 25° C., and $CTE_{500\text{-}900°\,C.}$ is the high temperature thermal expansion coefficient at 500° C. to 900° C., all as measured in the axial direction of the honeycomb; wherein after exposure to a temperature of 1050° C. for 100 hours, the honeycomb body exhibits at least one of: an elastic modulus ratio $E_{ratio} \leq 0.99$, and a microcrack parameter $Nb^3 \leq 0.07$; wherein $E_{ratio} = E_{900°\,C.}/E_{25°\,C.}$ where $E_{900°\,C.}$ is the elastic modulus at 900° C. measured during heating. In some embodiments, the total porosity % P is at least 50%. In some embodiments, the total porosity % P is at least 55%. In some embodiments, the total porosity % P is at least 60%. In some embodiments, the thermal shock parameter is at least 550° C. In some embodiments, the thermal shock parameter is at least 650° C. In some embodiments, after exposure to a temperature of 1050° C. for 100 hours the honeycomb body exhibits at least one of: an elastic modulus ratio $E_{ratio} \leq 0.96$, and a microcrack parameter $Nb^3 \leq 0.03$. In some embodiments, after exposure to a temperature of 1050° C. for 100 hours the honeycomb body exhibits at least one of: an elastic modulus ratio $E_{ratio} \leq 0.94$, and a microcrack parameter $Nb^3 \leq 0.015$. In some embodiments, after exposure to a temperature of 1050° C. for 100 hours the honeycomb body exhibits at least one of: a change in elastic modulus ratio $E_{ratio}$, after heating, $[(E_{ratio})_h - (E_{ratio})_i] \leq 0.06$, a change in microcrack parameter $Nb^3$ after heating, $[(Nb^3)_h - (Nb^3)_i] \leq 0.04$, and a fractional retained strength, $[(MOR)_h/(MOR)_i] \geq 0.50$, where "h" indicates the property after 100 hours at 1050° C., and "i" indicates the initial value before heat treatment; in some of these embodiments, after exposure to a temperature of 1050° C. for 100 hours the honeycomb body exhibits at least one of: a change in elastic modulus ratio $E_{ratio}$, after heating, $[(E_{ratio})_h - (E_{ratio})_i] \leq 0.04$, a change in microcrack parameter $Nb^3$ after heating, $[(Nb^3)_h - (Nb^3)_i] \leq 0.02$, and a fractional retained strength, $[(MOR)_h/(MOR)_i] \geq 0.70$; in others of these embodiments, after exposure to a temperature of 1050° C. for 100 hours the honeycomb body exhibits at least one of: a change in elastic modulus ratio $E_{ratio}$, after heating, $[(E_{ratio})_h - (E_{ratio})_i] \leq 0.02$, a change in microcrack parameter $Nb^3$ after heating, $[(Nb^3)_h - (Nb^3)_i] \leq 0.01$, and a fractional retained strength, $[(MOR)_h/(MOR)_i] \geq 0.90$. In some embodiments, the primary cordierite ceramic phase comprises cordierite crystals having a substantially preferred crystal orientation having a $\Delta_I$ greater than 0.10 where $\Delta_I = (I_T) - (I_A)$. In some embodiments, the porous ceramic honeycomb body has a $CTE_{25\text{-}800°\,C.} \leq 18.0 \times 10^{-7}/°$ C. In some embodiments, the porous ceramic honeycomb body has a $CTE_{25\text{-}800°\,C.} \leq 16.0 \times 10^{-7}/°$ C. In some embodiments, the porous ceramic honeycomb body has a $CTE_{25\text{-}800°\,C.} \leq 14.0 \times 10^{-7}/°$ C. In some embodiments, $d_b \leq 1.4$ wherein $d_b = (d_{90} - d_{10})/d_{50}$; in some of these embodiments, $d_b \leq 1.0$; in other of these embodiments, $d_b \leq 0.8$. In some embodiments, $d_f \leq 0.45$ wherein $d_f = (d_{50} - d_{10})/d_{50}$. In some embodiments, $d_f \leq 0.35$. In some embodiments, $d_f \leq 0.30$. In some embodiments, $PCF \geq 50$ wherein PCF is a pore connectivity factor and $PCF = (\% P)/d_b$; in some of these embodiments, $PCF \geq 70$; in other of these embodiments, $PCF \geq 85$. In some embodiments, the porous ceramic honeycomb body further comprises a secondary glass phase containing yttrium oxide. In some embodiments, the porous ceramic honeycomb body has a strain tolerance of at least $0.14 \times 10^{-2}$ where the strain tolerance=$(MOR_{25°\,C.}/E_{25°\,C.})$; in some of these embodiments, a strain tolerance of at least $0.16 \times 10^{-2}$; in some of these embodiments, a strain tolerance of at least $0.18 \times 10^{-2}$.

In another set of embodiments, a porous ceramic honeycomb body is disclosed herein comprising: a primary cordierite ceramic phase; a porosity % $P \geq 50\%$; and a thermal shock parameter $TSP \geq 550°$ C., wherein TSP is $(MOR_{25°\,C.}/E_{25°\,C.})(CTE_{500\text{-}900°\,C.})^{-1}$, $MOR_{25°\,C.}$ is the modulus of rupture strength at 25° C., $E_{25°\,C.}$ is the Young's elastic modulus at 25° C., and $CTE_{500\text{-}900°\,C.}$ is the high temperature thermal expansion coefficient at 500° C. to 900° C.; wherein after exposure to a temperature of 1050° C. for 100 hours, the honeycomb body exhibits at least one of: an elastic modulus ratio $E_{ratio} \leq 0.96$, and a microcrack parameter $Nb^3 \leq 0.03$, wherein $E_{ratio} = E_{900°\,C.}/E_{25°\,C.}$ where $E_{900°\,C.}$ is the elastic modulus at 900° C. measured during heating.

In another set of embodiments, a porous ceramic honeycomb body is disclosed herein comprising: a primary cordierite ceramic phase; a porosity % $P \geq 55\%$; and a thermal shock parameter (TSP) of at least 650° C., wherein TSP is $(MOR_{25°\,C.}/E_{25°\,C.})(CTE_{500\text{-}900°\,C.})^{-1}$, $MOR_{25°\,C.}$ is the modulus of rupture strength at 25° C., $E_{25°\,C.}$ is the Young's elastic modulus at 25° C., and $CTE_{500\text{-}900°\,C.}$ is the high temperature thermal expansion coefficient at 500° C. to 900° C.; wherein after exposure to a temperature of 1050° C. for 100 hours, the honeycomb body exhibits at least one of: an elastic modulus ratio $E_{ratio} \leq 0.94$, and a microcrack parameter $Nb^3 \leq 0.015$, wherein $E_{ratio} = E_{900°\,C.}/E_{25°\,C.}$ where $E_{900°\,C.}$ is the elastic modulus at 900° C. measured during heating.

In another set of embodiments, a method is disclosed herein for making a porous ceramic honeycomb body, the method comprising the steps of: providing a plasticized ceramic forming precursor batch composition including a cordierite forming inorganic powder batch mixture comprising a magnesium source, an aluminum source, and a silicon source, wherein each of the magnesium source, aluminum source, and silicon source has a weighted average median particle size diameter $D_{50} \leq 30$ microns, a binder, and a liquid vehicle; forming a honeycomb green body from the plasticized ceramic forming precursor batch composition; and firing the honeycomb green body under conditions effective to form a porous ceramic honeycomb body comprising: a primary cordierite ceramic phase; a total porosity % $P \geq 40\%$; and a thermal shock parameter $TSP \geq 450°$ C., wherein TSP is $(MOR_{25°\,C.}/E_{25°\,C.})(CTE_{500\text{-}900°\,C.})^{-1}$, $MOR_{25°\,C.}$ is the modulus of rupture strength at 25° C., $E_{25°\,C.}$ is the Young's elastic modulus at 25° C., and $CTE_{500\text{-}900°\,C.}$ is the high temperature thermal expansion coefficient at 500° C. to 900° C.; wherein after exposure to a temperature of 1050° C. for 100 hours, the formed ceramic honeycomb body exhibits at least one of: an elastic modulus ratio $E_{ratio} \leq 0.99$, and a microcrack parameter $Nb^3 \leq 0.07$, wherein $E_{ratio} = E_{900°\,C.}/E_{25°\,C.}$ where $E_{900°\,C.}$ is the elastic modulus at 900° C. measured during heating. In some embodiments, the cordierite forming inorganic powder batch mixture comprises a magnesium source and an aluminum silicate source having a median particle diameter $D_{50}$ less than 25 microns, the aluminum silicate source being selected from the group consisting of mullite, kyanite, calcined kyanite, sillimanite, calcined sillimanite, andalusite, or calcined andalusite, or combinations thereof. In some embodiments, the cordierite forming inorganic powder batch mixture comprises: kaolin, a magnesium aluminate spinel having a median particle diameter $D_{50}$ less than 20 microns, and at least one silicon source other than kaolin and one magnesium source other than spinel. In some embodiments, the cordierite forming inorganic powder batch mixture comprises: kaolin, a magnesium oxide forming source having a median particle diameter $D_{50}$ less than 10 microns, and at least one silicon source other than kaolin. In some embodiments, the plasticized ceramic forming precursor batch composition further comprises at least one pore forming agent. In some embodiments, the plasticized ceramic forming precursor batch composition comprises at least one glass forming metal oxide source. In some embodiments, the cordierite forming inorganic powder batch mixture comprises: talc having a median particle diameter $D_{50}$ in the range of from 3 to 30 microns, and in some of these embodiments between 3 and 25 microns, and an XRD morphology index of greater than 0.80; ≧10% of a magnesium aluminate spinel having a median particle diameter $D_{50}$ in the range of from 3 to 15 microns; 5 to 20% of a kaolin, and in some of these embodiments the kaolin has a median particle diameter $D_{50}$ of at least 5 microns; an alumina forming source having a median particle diameter $D_{50}$ in the range of from 3 to 12 microns, and in some of these embodiments between 3 and 10 microns; and a silica forming source other than kaolin having a median particle diameter $D_{50}$ in the range of from 4 to 20 microns, and in some of these embodiments between 4 and 10 microns. In some embodiments, the cordierite forming inorganic powder batch mixture comprises: talc having a median particle diameter $D_{50}$ in the range of from 3 to 30 microns, and in some of these embodiments between 3 and 25 microns, and an XRD morphology index of greater than 0.80; ≧10% of an aluminum silicate source having a median particle diameter $D_{50}$ in the range of from 4 to 15 microns, the aluminum silicate source being selected from the group consisting of mullite, kyanite, calcined kyanite, sillimanite, calcined sillimanite, andalusite, or calcined andalusite, or combinations thereof; an alumina forming source having a median particle diameter $D_{50}$ in the range of from 3 to 12 microns, and in some of these embodiments between 3 and 10 microns; and a silica forming source having a particle diameter $D_{50}$ in the range of from 4 to 20 microns, and in some of these embodiments between 4 and 10 microns. In some embodiments, the cordierite forming inorganic powder batch mixture comprises: talc having a median particle diameter $D_{50}$ in the range of from 3 to 30 microns, and in some of these embodiments between 3 and 25 microns, and an XRD morphology index of greater than 0.80; ≧5% of a magnesium oxide forming source having a median particle diameter $D_{50}$ less than 10 microns, and in some of these embodiments less than 3 microns; 5% to 20% of kaolin, and in some of these embodiments the kaolin has a median particle diameter $D_{50}$ of at least 5 microns; an alumina forming source having a median particle diameter $D_{50}$ in the range of from 0.5 to 12 microns, and in some of these embodiments between 0.5 and 10 microns; and a silica forming source, other than kaolin, having a particle diameter $D_{50}$ in the range of from 4 to 20 microns, and in some of these embodiments between 4 and 10 microns.

The disclosure has been described with reference to various specific embodiments and techniques. However, many variations and modifications are possible while remaining within the spirit and scope of the disclosure.

What is claimed is:

1. A sintered porous ceramic honeycomb body, comprising:
   a primary cordierite ceramic phase;
   a total porosity % P of at least 40%; and
   a thermal shock parameter (TSP) of at least 450° C., wherein TSP is $(MOR_{25° C.}/E_{25° C.})(CTE_{500-900° C.})^{-1}$, $MOR_{25° C.}$ is the modulus of rupture strength at 25° C., $E_{25° C.}$ is the Young's elastic modulus at 25° C., and $CTE_{500-900° C.}$ is the high temperature thermal expansion coefficient at 500° C. to 900° C., all as measured in the axial direction of the honeycomb;
   wherein after exposure to a temperature of 1050° C. for 100 hours, the honeycomb body exhibits at least one of:
   an elastic modulus ratio $E_{ratio} \leq 0.99$, and
   a microcrack parameter $Nb^3 \leq 0.07$
   wherein $E_{ratio} = E_{900° C.}/E_{25° C.}$ where $E_{900° C.}$ is the elastic modulus at 900° C. measured during heating, and
   wherein the primary cordierite ceramic phase comprises cordierite crystals having a substantially preferred crystal orientation having a $\Delta_I$ greater than 0.10 where $\Delta_I = (I_T) - (I_A)$.

2. The sintered porous ceramic honeycomb body of claim 1, wherein the total porosity % P is at least 50%.

3. The sintered porous ceramic honeycomb body of claim 1, wherein the total porosity % P is at least 55%.

4. The sintered porous ceramic honeycomb body of claim 1, wherein the total porosity % P is at least 60%.

5. The sintered porous ceramic honeycomb body of claim 1, wherein the thermal shock parameter is at least 550° C.

6. The sintered porous ceramic honeycomb body of claim 1, wherein after exposure to a temperature of 1050° C. for 100 hours the honeycomb body exhibits at least one of:
   an elastic modulus ratio $E_{ratio} \leq 0.96$, and
   a microcrack parameter $Nb^3 \leq 0.03$.

7. The sintered porous ceramic honeycomb body of claim 1, wherein after exposure to a temperature of 1050° C. for 100 hours the honeycomb body exhibits at least one of:
   an elastic modulus ratio $E_{ratio} \leq 0.94$, and
   a microcrack parameter $Nb^3 \leq 0.015$.

8. The sintered porous ceramic honeycomb body of claim 1, wherein after exposure to a temperature of 1050° C. for 100 hours the honeycomb body exhibits at least one of:
   a change in elastic modulus ratio $E_{ratio}$, after heating, $[(E_{ratio})_h - (E_{ratio})_i] \leq 0.06$,
   a change in microcrack parameter $Nb^3$ after heating, $[(Nb^3)_h - (Nb^3)_i] \leq 0.04$, and
   a fractional retained strength, $[(MOR)_h/(MOR)_i] \geq 0.50$, where "h" indicates the property after 100 hours at 1050° C., and "i" indicates the initial value before heat treatment.

9. The sintered porous ceramic honeycomb body of claim 8, wherein after exposure to a temperature of 1050° C. for 100 hours the honeycomb body exhibits at least one of:
   a change in elastic modulus ratio $E_{ratio}$, after heating, $[(E_{ratio})_h - (E_{ratio})_i] \leq 0.04$,
   a change in microcrack parameter $Nb^3$ after heating, $[(Nb^3)_h - (Nb^3)_i] \leq 0.02$, and
   a fractional retained strength, $[(MOR)_h/(MOR)_i] 0.70$.

10. The sintered porous ceramic honeycomb body of claim 8, wherein after exposure to a temperature of 1050° C. for 100 hours the honeycomb body exhibits at least one of:
    a change in elastic modulus ratio $E_{ratio}$, after heating, $[(E_{ratio})_h - (E_{ratio})_i] \leq 0.02$,
    a change in microcrack parameter $Nb^3$ after heating, $[(Nb^3)_h - (Nb^3)_i] \leq 0.01$, and
    a fractional retained strength, $[(MOR)_h/(MOR)_i] 0.90$.

11. The sintered porous ceramic honeycomb body of claim 1, further having a $CTE_{25-800° C.} \leq 18.0 \times 10^{-7}/° C$.

12. The sintered porous ceramic honeycomb body of claim 1, further comprising $d_b \leq 1.4$ wherein $d_b = (d_{90} - d_{10})/d_{50}$.

13. The sintered porous ceramic honeycomb body of claim 12, further comprising $d_b \leq 1.0$.

14. The sintered porous ceramic honeycomb body of claim 1, further comprising $d_f \leq 0.45$ wherein $d_f = (d_{50} - d_{10})/d_{50}$.

15. The sintered porous ceramic honeycomb body of claim 1, further comprising $PCF \geq 50$ wherein PCF is a pore connectivity factor and $PCF = (\% P)/d_b$.

16. The sintered porous ceramic honeycomb body of claim 1, further comprising a secondary glass phase containing yttrium oxide.

17. The sintered porous ceramic honeycomb body of claim 1, further comprising a strain tolerance of at least $0.14 \times 10^{-2}$ where the strain tolerance=$(MOR_{25°\ C.}/E_{25°\ C.})$ 18. A sintered porous ceramic honeycomb body, comprising:
- a primary cordierite ceramic phase;
- a porosity % $P \geq 50\%$; and
- a thermal shock parameter $TSP \geq 550°$ C., wherein TSP is $(MOR_{25°\ C.}/E_{25°\ C.})(CTE_{500\text{-}900°\ C.})^{-1}$, $MOR_{25°\ C.}$ is the modulus of rupture strength at 25° C., $E_{25°\ C.}$ is the Young's elastic modulus at 25° C., and $CTE_{500\text{-}900°\ C.}$ is the high temperature thermal expansion coefficient at 500° C. to 900° C.;
- wherein after exposure to a temperature of 1050° C. for 100 hours, the honeycomb body exhibits at least one of:
- an elastic modulus ratio $E_{ratio} \leq 0.96$, and
- a microcrack parameter $Nb^3 \leq 0.03$
- wherein $E_{ratio} = E_{900°\ C.}/E_{25°\ C.}$ where $E_{900°\ C.}$ is the elastic modulus at 900° C. measured during heating, and
- wherein the primary cordierite ceramic phase comprises cordierite crystals having a substantially preferred crystal orientation having a $\Delta_I$ greater than 0.10 where $\Delta_I = (I_T) - (I_A)$.

19. A sintered porous ceramic honeycomb body, comprising:
- a primary cordierite ceramic phase;
- a porosity % $P \geq 55\%$; and
- a thermal shock parameter (TSP) of at least 650° C., wherein TSP is $(MOR_{25°\ C.}/E_{25°\ C.})(CTE_{500\text{-}900°\ C.})^{-1}$, $MOR_{25°\ C.}$ is the modulus of rupture strength at 25° C., $E_{25°\ C.}$ is the Young's elastic modulus at 25° C., and $CTE_{500\text{-}900°\ C.}$ is the high temperature thermal expansion coefficient at 500° C. to 900° C.;
- wherein after exposure to a temperature of 1050° C. for 100 hours, the honeycomb body exhibits at least one of:
- an elastic modulus ratio $E_{ratio} \leq 0.94$, and
- a microcrack parameter $Nb^3 \leq 0.015$
- wherein $E_{ratio} = E_{900°\ C.}/E_{25°\ C.}$ where $E_{900°\ C.}$ is the elastic modulus at 900° C. measured during heating, and
- wherein the primary cordierite ceramic phase comprises cordierite crystals having a substantially preferred crystal orientation having a $\Delta_I$ greater than 0.10 where $\Delta_I = (I_T) - (I_A)$.

* * * * *